US010122723B1

(12) United States Patent
Chang et al.

(10) Patent No.: US 10,122,723 B1
(45) Date of Patent: Nov. 6, 2018

(54) SUPERVISED CONTACT LIST FOR USER ACCOUNTS

(71) Applicant: Google Inc., Mountain View, CA (US)

(72) Inventors: Austin Chang, San Francisco, CA (US); Eider Silva De Oliveira, Mountain View, CA (US); Gregory Scott, San Jose, CA (US); Amar Gandhi, Mountain View, CA (US); Saurabh Sharma, San Francisco, CA (US)

(73) Assignee: Google LLC, Mountain View, CA (US)

( * ) Notice: Subject to any disclaimer, the term of this patent is extended or adjusted under 35 U.S.C. 154(b) by 48 days.

(21) Appl. No.: 14/934,131

(22) Filed: Nov. 5, 2015

Related U.S. Application Data

(60) Provisional application No. 62/075,884, filed on Nov. 6, 2014.

(51) Int. Cl.
 *G06F 7/04* (2006.01)
 *G06F 15/16* (2006.01)
 *G06F 17/30* (2006.01)
 *H04L 29/06* (2006.01)

(52) U.S. Cl.
 CPC .................. *H04L 63/101* (2013.01)

(58) Field of Classification Search
 CPC ... H04L 63/101; H04L 63/102; H04L 63/104; H04L 67/22
 See application file for complete search history.

(56) References Cited

U.S. PATENT DOCUMENTS

| 6,668,173 | B2 | 12/2003 | Greene |
| 7,593,740 | B2 | 9/2009 | Crowley et al. |
| 7,640,336 | B1 * | 12/2009 | Lu .......................... G06Q 10/10 709/206 |
| 7,716,140 | B1 | 5/2010 | Nielsen et al. |
| 7,949,611 | B1 | 5/2011 | Nielsen et al. |
| 8,407,250 | B2 | 3/2013 | Saha et al. |
| 8,429,090 | B1 | 4/2013 | Nielsen et al. |
| 8,489,516 | B1 | 7/2013 | Nielsen et al. |

(Continued)

OTHER PUBLICATIONS

USPTO, First Action Interview, Pre-Interview Communication for U.S. Appl. No. 14/934,123, dated Sep. 1, 2017, 5 pages.

(Continued)

*Primary Examiner* — Alexander Lagor
*Assistant Examiner* — Vu V Tran
(74) *Attorney, Agent, or Firm* — IP Spring

(57) ABSTRACT

Implementations relate to a supervised contact list for user accounts. In some implementations, a method includes determining an activity related to a particular user is pending on a device operated by a supervised user associated with a supervised account. The method includes associating the particular user with a particular user identifier, and determining whether the particular user identifier is present on a supervised contact list associated with the supervised account, where the supervised contact list comprises identifiers for one or more users. The one or more users are selected by a supervisor user. The method includes determining that the activity related to the particular user to be performed should be disallowed, based on whether the particular user identifier is present on the supervised contact list, and terminating the activity related to the particular user.

18 Claims, 7 Drawing Sheets

(56) References Cited

U.S. PATENT DOCUMENTS

| | | | |
|---|---|---|---|
| 8,595,295 B2 | 11/2013 | Wherry et al. | |
| 8,621,554 B1 | 12/2013 | Yu et al. | |
| 8,832,151 B2 | 9/2014 | Saha et al. | |
| 9,076,009 B2 | 7/2015 | Sathish et al. | |
| 2005/0080859 A1* | 4/2005 | Lake | H04L 51/04 709/206 |
| 2005/0096009 A1* | 5/2005 | Ackley | H04M 1/663 455/405 |
| 2006/0270419 A1 | 11/2006 | Crowley et al. | |
| 2007/0180100 A1* | 8/2007 | Biggs | G06F 21/554 709/224 |
| 2008/0005325 A1* | 1/2008 | Wynn | G06Q 10/107 709/225 |
| 2008/0146211 A1* | 6/2008 | Mikan | H04M 3/2281 455/419 |
| 2009/0197569 A1* | 8/2009 | Gaznaghi | H04M 3/54 455/410 |
| 2009/0254656 A1 | 10/2009 | Vignisson et al. | |
| 2010/0161734 A1* | 6/2010 | Wang | H04L 51/12 709/206 |
| 2010/0248744 A1* | 9/2010 | Bychkov | H04W 4/02 455/456.2 |
| 2011/0131605 A1* | 6/2011 | Pratt | G06F 17/30994 725/39 |
| 2012/0079562 A1* | 3/2012 | Anttila | G06F 21/51 726/3 |
| 2013/0017806 A1* | 1/2013 | Sprigg | H04M 1/66 455/411 |
| 2013/0024516 A1* | 1/2013 | Blinder | G06Q 30/02 709/204 |
| 2014/0007154 A1* | 1/2014 | Seibold | H04N 21/4122 725/25 |
| 2014/0025724 A1 | 1/2014 | Granger et al. | |
| 2014/0162595 A1 | 6/2014 | Raleigh et al. | |
| 2014/0187292 A1* | 7/2014 | Poole | H04M 1/274516 455/564 |
| 2015/0271639 A1 | 9/2015 | Ziskind et al. | |
| 2016/0044087 A1* | 2/2016 | Velummylum | H04L 67/08 726/4 |

OTHER PUBLICATIONS

USPTO, First Action Interview, Office Action Summary for U.S. Appl. No. 14/934,123, dated Oct. 30, 2017, 10 pages.

USPTO, Final Office Action for U.S. Appl. No. 14/934,123, dated Mar. 5, 2018, 31 pages.

USPTO, First Action Interview, Pre-Interview Communication for U.S. Appl. No. 14/934,133, dated Apr. 26, 2018, 5 pages.

* cited by examiner

SUPERVISED CONTACT LIST FOR USER ACCOUNTS

CROSS REFERENCE TO RELATED APPLICATIONS

The present application claims priority to U.S. Provisional Application No. 62/075,884, filed Nov. 6, 2014 and titled SUPERVISED CONTACT LIST FOR USER ACCOUNTS, which is incorporated herein by reference in its entirety.

BACKGROUND

The popularity and convenience of digital devices have caused the use of various functions and abilities of these devices to become ubiquitous. For example, users of cell phones, tablet computers, personal digital assistants, and wearable devices (watches, goggles, glasses, etc.) can carry or wear these devices on their persons to communicate with other users via connected networks, receive various visual and auditory content from the devices, run various application programs, etc., in practically any setting. In some other examples, devices can allow users to connect to sites and services offered over the Internet to obtain information on various topics, purchase goods and services, play games with other users, send and receive messages with other users, locate themselves and other users geographically, etc.

SUMMARY

Implementations of the present application relate to a supervised contact list for user accounts. In some implementations, a method includes determining an activity related to a particular user is pending on a device operated by a supervised user associated with a supervised account. The method includes associating the particular user with a particular user identifier, and determining whether the particular user identifier is present on a supervised contact list associated with the supervised account, where the supervised contact list comprises identifiers for one or more users. The one or more users are selected by a supervisor user. The method includes determining that the activity related to the particular user to be performed should be disallowed, based on whether the particular user identifier is present on the supervised contact list, and terminating the activity related to the particular user.

Various implementations and examples of the method are described. For example, the supervised account can be included in a stored supervisory account structure comprising user accounts that provide access to a server system by associated users, and the supervisor user can be associated with a supervisor account included in the supervisory account structure. For example, the associated users can be members of a social relationship of users associated with the supervised user, where the account structure can be a family account structure and the user accounts can be associated with users of a family social group, the supervisor account can be a parent account associated with a parent user belonging to the family social group, and the supervised account can be a child account associated with a child user belonging to the family social group. The particular user can be an external user who is associated with a user account external to the supervisory account structure.

The activity related to the particular user can include communicating with a device of the particular user using the device of the supervised user. The activity can include adding the particular user or a user account of the particular user to a personal contact list, user group, or game of the supervised user. The supervised contact list can include identifiers for one or more users prohibited from involvement with the supervised account by the supervisor user. The supervised contact list can be stored in association with the supervised account, and a supervised contact list can be stored in association with each supervised account of the supervisory account structure having one or more predetermined attributes. In another example, the account structure can be a family account structure including one or more supervisor accounts that are parent accounts associated with one or more parent users and one or more supervised accounts that are child accounts associated with one or more child users, and a supervised contact list can be stored in association with one or more child accounts used by one or more associated child users under a predetermined age.

In some examples, the method further includes sending a request to the supervisor account for approval of the particular user, where the determining that the activity related to the particular user to be performed using the device should be disallowed is also based on a failure to receive the approval from the supervisor account. The method can further include sending a request to the supervisor account for approval of the particular user, and, in response to receiving an approval from the supervisor account, adding the particular user identifier to the supervised contact list. The method can further include receiving input from the supervisor user causing one or more changes to the listed users on the supervised contact list, where the one or more changes include at least one of adding one or more users to the supervised contact list and deleting one or more users from the supervised contact list. The supervised account can be associated with one or more designations of types of device activities for the supervised account that require examining the supervised contact list. The supervised account can be associated with one or more designations of users who are qualified to have associated user identifiers added to the supervised contact list without approval from the supervisor user. The supervised account can be associated with one or more designations of types of activities that cause a request for permission to be sent to the supervisor account in response to determining that an identifier associated with the particular user is not present on the supervised contact list.

In some implementations, a system can include a storage device and at least one processor accessing the storage device and configured to perform operations. The operations include determining an activity related to a particular user is pending on a device operated by a supervised user associated with a supervised account, and determining that the activity is of a type that requires examining a supervised contact list associated with the supervised account. The operations include associating the particular user with a particular user identifier, and determining whether the particular user is present on the supervised contact list, where the supervised contact list comprises identifiers for one or more users, where the one or more users are selected by a supervisor user. The operations determine that the activity related to the particular user to be performed using the device should be disallowed, based on whether the particular user identifier is present on the supervised contact list, and terminate the activity related to the particular user.

Various implementations and examples of the system are described. For example, the supervised account can be included in a stored supervisory account structure comprising user accounts that provide access to a server system by associated users, where the supervisor user can be associated with a supervisor account included in the supervisory account structure, and the particular user can be associated with a user account external to the supervisory account structure. The associated users can be members of a social relationship of users associated with the supervised user, the account structure can be a family account structure, and the user accounts can be associated with users of a family social group, where the supervisor account is a parent account associated with a parent user belonging to the social family group and the supervised account is a child account associated with a child user belonging to the social family group. In some examples, only designated types of activities can cause a request for permission to be sent to the supervisor account in response to determining that a user identifier associated with the particular user is not present on the supervised contact list.

In some implementations, a non-transitory computer readable medium has stored thereon program instructions that, when executed by a processor, cause the processor to perform various operations. The operations include determining an activity related to a particular user is pending on a device operated by a supervised user associated with a supervised account. The operations include associating the particular user with a particular user identifier, and determining whether the particular user is present on a supervised contact list associated with the supervised account, where the supervised contact list comprises identifiers for one or more users. The one or more users are selected by a supervisor user. The operations including determining that the activity related to the particular user to be performed using the device should be disallowed, based on whether the particular user identifier is present on the supervised contact list, and terminating the activity related to the particular user.

Various implementations and examples of the computer readable medium are described. For example, the activity related to the particular user can include at least one of: communicating with a device of the particular user using the device of the supervised user, and adding the particular user or a user account of the particular user to a personal contact list, user group, or game of the supervised user.

DETAILED DESCRIPTION

Figure 1:
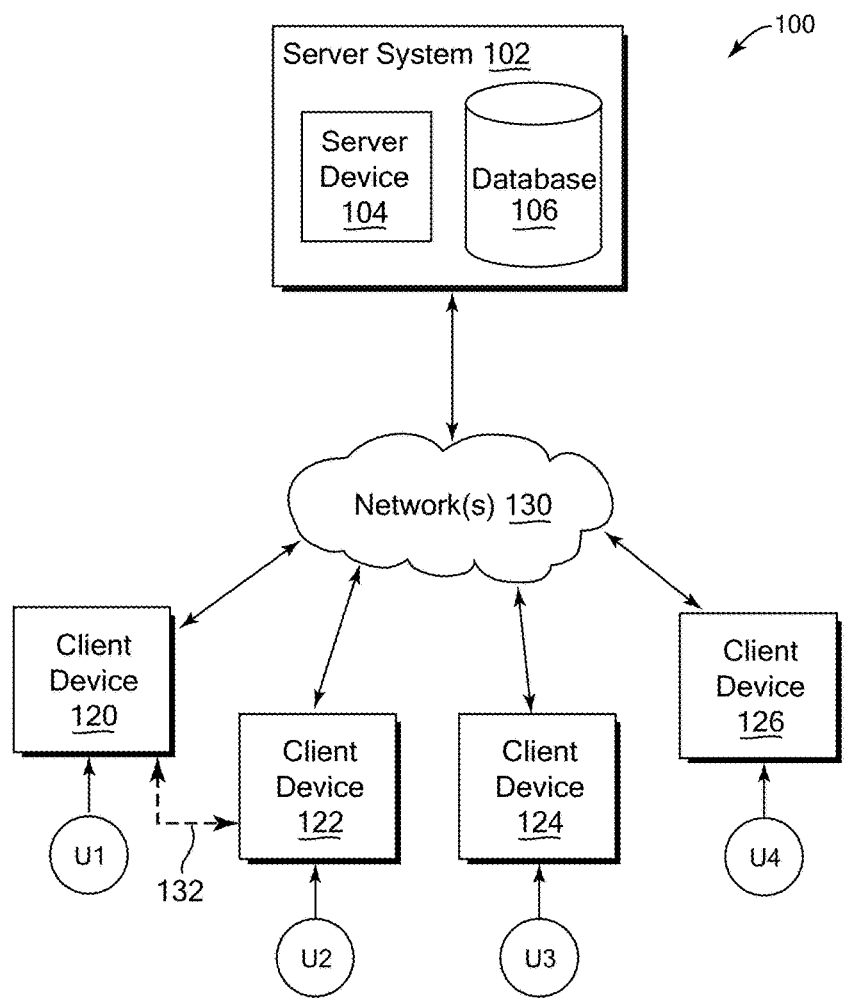
FIG. 1 is a block diagram of an example network environment which may be used for one or more implementations described herein.

One or more implementations described herein relate to supervised contact lists for user accounts. For example, some implementations can allow a user of a supervisory account in a supervisory account structure to determine or create a supervised contact list for one or more supervised accounts of the supervisory account structure. In some examples, the supervisory account structure can be a family account structure, and the users can be members of a social relationship of users that are associated with the user of the device, e.g., a family relationship, and the user accounts can provide associated users access to a server system. In some examples, the account structure can include types of supervisor accounts (e.g., parent accounts) and supervised accounts (e.g., child accounts) which can, for example, correspond to roles of the users of the accounts in a social relationship of users. In some examples, a family social group can include parent roles and child roles. In some implementations, the user accounts can be provided in a hierarchy and provide a user of a supervisor account with particular privileges that users of supervised accounts do not have.

In some implementations, a supervised contact list (or supervised social graph) governs (or informs) which users are approved to be involved in supervised user-related activities with the associated supervised account using devices. For example, one supervised user-related activity can be users (e.g., user identifiers) listed on an approved contact list of the supervised contact list communicating with the supervised user account, e.g., via devices used by the users. The approval status of users can be checked automatically by the system by examining the supervised contact list, without having to involve a supervisor user. This allows an application running on a device to consult the supervised contact list to determine which other users (e.g., user accounts outside the supervised user's account structure) are allowed to contact the supervised user account, interact with the supervised user account, or whose user account can otherwise be involved in any device activity with the supervised user account. Some implementations can also send a request to a supervisor user if a particular user is not found on the approved contact list. For example, a supervisor user can approve or disapprove of a user involved in a supervised user-related activity at the time of the activity, or at a later time. In some implementations, the supervisor user can disapprove of a user, which can cause the user be listed on a disapproved contact list of the supervised contact list. Activities with users on the disapproved list are not allowed on the device of the supervised user. A supervisor user can review and modify the supervised contact list, e.g., review listed users and interaction histories of listed users with the supervised user, review the supervised user's contact list, etc., delete or add other users to the list, etc. Various preferences can allow the supervisor user to designate particular types of activities and/or users with different statuses, e.g., where some statuses indicate automatic approvals, some statuses cause requests for permission to be sent to supervisor users, etc.

These and other described features of supervised contact lists for user accounts can allow multiple advantages to users of devices and developers of software for devices. For example, the supervised contact list allows supervisor users to control which users that a supervised user in the account structure can interact with. For example, parent users of a family account structure can control which users that particular child users of the family can contact and interact with via the child's devices, for such device activities as sending messages, receiving messages, connecting in voice calls and video calls, playing games, contacting via social networking services and other services, etc. The approved contact list allows parent users to designate a set of users that are known to be safe by the parent, and application running on the child's device that have been set up to run within the family account structure context will consult the supervised contact list before allowing user-related application activities on a device by the child user. These features thus can greatly enhance the safety of device communications and activities for a child user under a young age, e.g., child users under a predetermined threshold age, and alleviate parent users' fears of contact and activities with strangers. Furthermore, since applications can automatically consult the supervised contact list for permission, a supervisor user does not have to manually approve each user involved in each activity of the supervised user's device. In addition, developers can develop application programs, other programs, APIs, and/or standard communication interfaces for devices that can enable consultation of one or more supervised contact lists associated with a user account, without having to implement a dedicated contact list in each application program, and without having to directly request permission from supervisor users for each user activity. Furthermore, in some implementations a supervised user need not have to add the same set of friend users to different interactive application programs, since such application programs can consult the same supervised contact list to automatically add such users or allow their involvement in user device activities.

Thus, a technical effect of the supervised contact list as disclosed herein includes a reduction in the amount of time and effort that supervisor users (e.g., parent users) have to expend in managing device interactions of supervised users (e.g., child users), In addition, features allow a reduction in the amount of time and effort that supervised users have to expend in setting up devices to interact with other known and trusted users, thus saving time, energy, and resources of users. Features disclosed herein thus allow reduction in use of device resources (e.g., memory, communication bandwidth, processing, etc.) of supervisor user devices, supervised user devices, and server devices.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130.

Network 130 can include one or more of any types of communication networks. For example, network 130 can include the Internet or other wide area network (WAN), such that server system 102 can communicate with other devices connected to the Internet. One or more of client devices 120, 122, 124, and 126 can also be connected to the Internet in network 130 to communicate with server system 102 and/or other client devices 120-126. In some implementations, server system 102 and/or client devices 120-126 are connected to one or more local networks of network 130, e.g., local area networks (LANs), wireless local networks (e.g., Wi-Fi using IEEE standard 802.11), peer-to-peer networks (Bluetooth®, Wi-Fi Direct, etc.), etc. One example of peer-to-peer communications between two client devices 120 and 122 is shown by arrow 132. For example, a client device can connect to a local area network which in turn connects to the Internet, which connects to server system 102. In other implementations, server or client devices can be connected to the Internet via other networks, e.g., a phone network, wireless cell phone network, wireless cell phone data network, etc. In some examples, client devices 120-126 that are both connected to the same local network can communicate with each other over that local network without having to communicate over the Internet. Any of the various networks in network 130 can include wired and wireless networks, switches, routers, hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., a computer system, laptop computer, portable device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via applications running on respective client devices and/or server system 102, and/or via a network service implemented on server system 102, e.g., a social network service, online store, message service, photo service, web site, or other service. For example, respective client devices 120, 122, 124, and 126 may communicate data to and from one or more server systems (e.g., system 102). In some implementations, the server system 102 may provide appropriate data to the client devices such that each client device can receive communicated content or shared content uploaded to the server system 102 and/or network service. In some examples, users U1-U4 can interact via audio or video conferencing, audio, video, or text chat, or other communication modes or applications. A network service implemented by server system 102 can include a system allowing users to perform a variety of communications, form links and associations, upload and post shared content such as images, text, video, audio, and other types of content, and/or perform other functions. Other online sites provided on server systems (e.g., system 102), including websites, online services, and online information sources, can be similarly accessed by client devices. For example, many types of online sites allow users to create accounts which provide access to the users of the service's resources provided on the server system 102. For example, a client device can display received data such as user content or statuses of other client devices sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some examples related to one or more implementations described herein, some of the users U1-U4 can be supervisor account users (supervisor users) and some of the users U1-U4 can be supervised account users (supervised users). As described below, a supervisory account structure provided and stored, e.g., by server system 102, can define user accounts for these users with these roles of supervisor and supervised, or more specific roles in a particular application, e.g., family roles in a family account structure. A particular user can sign into a particular account on any of the client devices 120-126 to be assigned the role and other attributes associated with that account, based on the relationship of the account with one or more other accounts in the supervisory account structure. The account structure allows different types of user accounts to use the features of client devices 120-126 and communicate with other client devices in different ways, as described below.

One or more user interfaces on a client device 120, 122, 124, and/or 126 (or other devices) can enable display of user content including images, video, data, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide application programs that run on the devices. Some application programs can be configured to interface with a supervisory account structure as described herein, allowing the application programs to communicate with user accounts of the supervisory account structure. Application programs can provide one or more associated user interfaces that are displayed on a display device associated with the server system or client device. The user interface may provide various options to a user for the application programs.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device having a display screen can display images and provide features and results as described herein that are viewable to a user.

Figure 2:
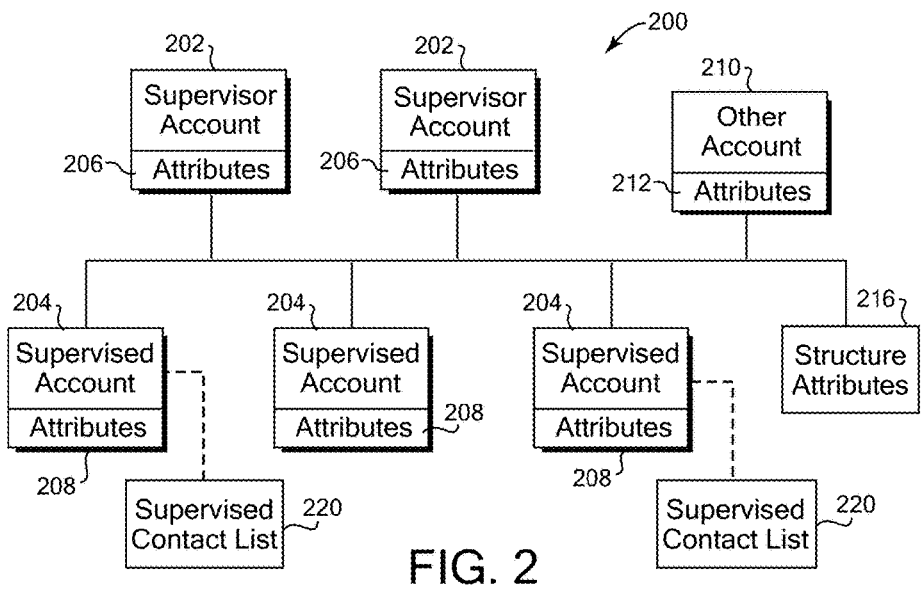
FIG. 2 is a block diagram illustrating a representation of an example supervisory account structure which can be used for one or more implementations described herein.

FIG. 2 is a block diagram illustrating an example representation of an example account structure which is shown as a supervisory account structure 200 and can be used for one or more implementations described herein. Account structure 200 can be accessed by a server system, e.g., a system 102 as described above with reference to FIG. 1, and includes one or more user accounts. Herein, a user account is a stored indication of a grant to one or more associated users of access to a system hosting the account, e.g., a server system, client device, etc. In some examples, the user account is implemented as a data structure implemented in data storage device(s) that stores the particular characteristics of the access, e.g., the particular type and/or amount of resources of the system that the user can access, the times of allowed access, other conditions of access, etc. The user account can store characteristics or other information associated with the user which are required to be presented by the user to the system being accessed to obtain the access, e.g., user name, password, description of other identifying information, etc. In some implementations, the user account can store other data associated with its user, e.g., personal data used by the user in communications, activities, or transactions, purchased and/or downloaded applications, items, or information, tasks, etc. For example, credit, debt, or monetary amounts, scores, item descriptions, or various other information can be stored for the associated user in the account. Some implementations can label each user account with an account name, which can be a user name, email address, and/or other designation.

Supervisory account structure 200 defines an association of multiple user accounts with each other. In some implementations, the association can represent (or coincide with) a social relationship between users. For example, a family social relationship can be represented, an example of which is described below with respect to FIG. 3. Other social relationships can alternatively be represented in some implementations, e.g., organizations, groups, etc. In some examples, each account can reference each other account in the structure 200. For example, if one of the accounts is referenced by the server system, that account has pointers or other indications to the account structure 200 and/or to the other accounts in the account structure such that the server system can find or be directed to one or more of the other accounts in the structure 200. For example, one or more pointers can be stored in association with each account to refer to other account names, memory addresses of other accounts, other storage locations at which to find the other accounts of the structure 200 and/or particular types of other accounts in the structure (e.g., as indicated by attributes described below).

Multiple types of user accounts can be included in the supervisory account structure 200. In this example, the types include supervisor user accounts 202 and supervised user accounts 204. A type can be associated with access privileges to the server system and other abilities or functions associated with the type, where the access privileges are provided to the account of that type. In one example, supervisor accounts can be provided with greater access privileges to resources of the server system and supervisory abilities over supervised accounts, while supervised accounts can be provided with lesser access privileges and no supervisory abilities, as described below.

One or more of the accounts 202 or 204 can include attributes, e.g., attributes 206 for accounts 202 and attributes 208 for accounts 204. Some attributes for each account can be different than one or more attributes for other accounts, and/or some attributes can be the same across multiple accounts. The attributes can indicate a variety of information related to the account, including statuses (current, past, and/or future) of the account, statuses of the user associated with the account, privileges of the user of the account with regards to an accessed server system and with regards to abilities over other accounts and functions involving users, devices, and programs accessing or communicating with accounts, labels associated with the account, etc. In some implementations, attributes can indicate whether a user account is a supervisor user account, supervised user account, or other type of user account.

In one example of account attributes, the user accounts in the supervisory account structure 200 can each be associated with one or more role labels. For example, a role label can be a common word or term used by users or application programs to identify a role within a social user relationship represented by the account structure 200. An account associated with such a role can be assigned the appropriate corresponding labels for that role. The role labels allow user accounts having a role label to be referred to by a user or application program using the role label. The role labels can allow users of the account structure to refer to and communicate with different users of the account structure semantically, e.g., based on well-known terms that have meaning to the users of the social relationship, rather than having to refer to users using names, email addresses, account names, or other formal designations that may be less familiar to the users.

The role labels can have meaning within the context of the social relationship represented by the account structure. For example, role labels such as "mom," "mother," "child," etc. are known to user members of a family social relationship to refer to particular users and user accounts, where those labels have meaning in context of the family social relationship (e.g., "mom" refers to a particular user and user account only to members of a particular family relationship, and this term refers to a different user account for persons not included in that family relationship).

In some examples, specific user accounts in the same supervisory account structure 200 can be searched for and found based on role labels related to the roles of the accounts or the users of the accounts. In the family example of FIG. 3 described below, the role label can be a family role label, e.g., "father," "mother," "child," etc. Other example role labels can be assigned based on other social groups having roles, e.g., sports teams (coach and players), business relationships (manager, employees, etc.), or other groups. Using the family roles example, a child supervised account can be referenced using the role label "child", and the specific parent account supervising that child account can be found based on a role label of "parent" with reference to the role label of "child" in the same supervisory account structure. Thus, the parent account can be referenced without having to specify a particular parent name or parent account name. The account structure thus allows finding user accounts based on the role relationships between members of a group and corresponding to those user accounts.

In some implementations, e.g., example implementations described below with reference to FIG. 5, one or more supervised contact lists 220 can be associated with one or more associated supervised accounts 204. For example, in some implementations, each supervised account 204 can be associated with a respective supervised contact list. In some implementations, some of the supervised accounts 204 can be associated with a supervised contact list 220, and other supervised accounts 204 are not associated with lists 220. In some implementations, one or more supervised contact lists 220 can be associated with the account structure 200, and any qualifying supervised account or other type of qualifying user account is associated with the supervised contact lists 220 of the account structure 200.

In some examples, a supervised contact list 220 can list a set of users (e.g., user accounts) with which the associated user account (e.g., the associated supervised account 204) has been approved to interact in various device activities related to other users. Alternatively or additionally, the supervised contact list can list a set of disapproved users with which the associated user account is prohibited from interacting. In some implementations, the supervised contact list can be a graph, e.g., a supervised social graph indicating social and personal relations of a user to other users (e.g., a social graph indicating a social network of different degrees of separation between users, etc.). In some examples, each supervised contact list 220 can be stored in association with its associated supervised account 204 and can include data including information related to the listed users, e.g., identification information, phone numbers, network addresses, physical addresses, history log information describing interactions with the supervised account, and/or other data, e.g., as described in examples below. Some implementations can also store one or more personal contact lists (or other sets of contacts or addresses of other users) in association with each supervised account, which in some cases can be different than the supervised contact list as described below.

Some user accounts of the account structure 200 can have a hierarchical relationship with one or more other accounts. In the example of FIG. 2, at least two levels of hierarchy of user accounts are shown, although more levels of accounts can be included in the hierarchy. For example, the supervisor accounts 202 can be at a higher level of the hierarchy than supervised accounts 204. In some implementations, the hierarchy can be explicitly designated via attributes or other descriptors associated with accounts. Some implementations need not explicitly indicate a level of hierarchy for each account, and hierarchal positions can be implied based on the presence of particular attributes in some accounts compared to the absence of the attributes in other accounts. For example, a first account having an attribute indicating it has supervisory ability over a second account in the structure can be considered at a higher level in the hierarchy than the second account that does not have this ability with respect to the first account.

In some implementations, the supervisor accounts 202 have greater access to resources of the server system implementing the accounts and account structure 202 than the supervised accounts 204. In one example, the supervisor accounts can be allowed unrestricted access to resources allowed to (non-administrator) user accounts on the system, and supervised accounts can be allowed, as a default, access only to a subset of those resources, e.g., basic resources of storage space for personal data, access to help information and other basic applications of the server system, etc. In some implementations, the user of the supervisor account can grant access to the supervised account to additional resources of the server system, or can restrict access to resources of the server system by the supervised account.

Some implementations can provide supervisory abilities, e.g., control and monitoring abilities, to a supervisor account over one or more of the supervised accounts in the same supervisory account structure 200 as the supervisor account. In some examples, the supervisor account can perform control abilities including changing attributes of one or more designated supervised accounts in the same structure, e.g., account name, account password, access conditions for the user of the supervised account, attributes of the account, personal data stored in association with the account, etc.

In some implementations, the supervisory account structure can be fixed (e.g., unchanging or persistent) with respect to its member accounts, or fixed with respect to particular accounts of the account structure. For example, most of the accounts in the structure can be disallowed by the implementing system from leaving the supervisory account structure, and disallowed from adding other accounts to the supervisory account structure. For example, in some implementations, supervised accounts can be disallowed from making changes to the account structure 200. Some implementations can allow one or more of the supervisor accounts 202 to modify the account structure 200, e.g., one of the supervisor accounts can be designated as a controlling account that is associated with the user that set up the account structure (or later transferred to another supervisor account from the account that set up the structure). The controlling account can be given privileges allowing the user of the controlling account to remove one or more accounts from the structure, add other accounts to structure, delete the structure, or make other changes to the account structure 200. Some implementations can prevent the controlling user from making changes to the accounts except for supervised accounts and/or attributes related to the supervisory account structure.

Some implementations of the supervisory account structure 200 can include one or more other user accounts, represented by other account 210 having attributes 212 as shown in FIG. 2. Such other accounts can be associated with the accounts of the account structure 200 but may be neither supervisor accounts nor supervised accounts. For example, such other accounts may be at a level between the supervisor accounts 202 and supervised accounts 204 in a hierarchy of accounts in the structure 200, and/or may be at different levels of the hierarchy. In some implementations, other accounts 200 can be given any account structure attributes by the controlling user. In some examples, other accounts 210 can receive and send information to the other accounts of the structure that is intended for the social relationship of users represented by the account structure 200, may not be subject to supervisory ability of the supervisor accounts 202, and may not have some privileges of the supervisor accounts 202.

In some implementations, the account structure can have structure attributes 216 that can relate to the account structure and/or all the accounts of the account structure. For example, an account structure name and other characteristics can be stored in attributes 216.

Multiple supervisory account structures 200 can be provided in a server system. For example, each supervisory account structure can only provide association between the user accounts within that structure. For example, a supervisor account in one structure 200 can have control and monitoring abilities over only the supervised accounts in the same structure 200. A different account structure similar to 200 can have different supervisor accounts and supervised accounts, where the supervisor accounts of the different account structure can have control and monitoring abilities only over the supervised accounts of the different account structure.

Figure 3:
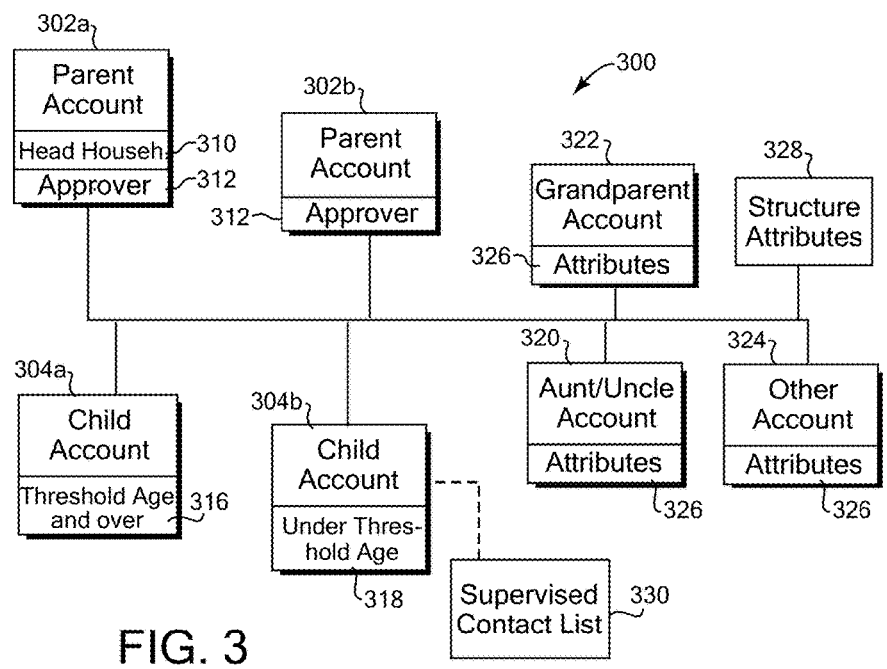
FIG. 3 is a block diagram illustrating an representation of an example supervisory account structure for use with a social family group.

FIG. 3 is a block diagram illustrating an example representation of an example supervisory account structure 300 similar to the account structure 200 described above for FIG. 2, and tailored for use with a social family group. A "family" as referred to herein can be a social family relationship of users, e.g., which can be a close-knit group of people. The family includes roles of at least one parent user and at least one child user. In some implementations, a family can also include extended relations or other users considered socially close enough to be considered "family", e.g., uncles, aunts, nephews, nieces, cousins (to a predefined degree), and/or even close friends in some implementations.

The family account structure 300 can include multiple user accounts, each having a type corresponding to a roles of a user of a social family, e.g., a role of the user within the family relationship of users. For example, the types can include one or more parent accounts and one or more child accounts. In this example of a structure 300 corresponding to a particular family, two parent accounts 302 and two child accounts 304 are provided to correspond to these members of the social family. The parent accounts and child accounts can function similarly to the supervisor accounts 202 and supervised accounts 204, respectively, as described above for FIG. 2. Thus, parent accounts 302 are at a higher level of the hierarchy of the family account structure 300 than the child accounts 304. In some examples, a parent user has privileges using an associated parent account that child users do not have via use of a child account of the structure, and the parent user can be provided a degree of supervisory ability over child accounts. In some implementations a parent account is provided with more supervisory ability (e.g., in degree and/or in types of actions or functions) over a child under a predetermined age than a child user over the predetermined age. In one example, the age can be a predetermined specified number of years as specified by a server system, or can be specified by a supervisor user. Other characteristics, actions or other criteria of an account or user of the account can be examined to determine whether or not to assign supervisory ability over the account. As explained above for supervisory accounts, the family account structure allows the family member accounts to be associated with each other such that information designated to be received by or sent to any or all of the users of the family is automatically available to the corresponding user accounts of the family account structure. This allows applications to take advantage of communicating with other family users without having to know the particular addresses (e.g., email address) of each accounts of those users, as described in greater detail herein.

One or more particular parent accounts 302 can have different attributes and/or hierarchy placements than other parent accounts 302 in some implementations. For example, parent account 302*a* can have a role attribute, e.g., a head of household attribute 310 (e.g., in addition to the parent role attribute). In this example, parent account 302*b* does not have this attribute. The head of household attribute 310 (or other named attribute indicating a highest status) can indicate that the associated parent account provides the highest privileges to the user of the parent account relative to the other accounts in the family account structure 300. For example, a head of household account 302*a* may have been the account of the user that created the family account structure 300, e.g., adding and/or creating the accounts included within the structure 300. A user of a head of household account 302*a* can be provided with privileges, e.g., the ability to remove accounts from the structure 300, add new accounts to the structure 300, delete the family structure 300, assign privileges to other user accounts of the account structure, and/or modify the structure 300 in other ways.

One or more parent accounts 302*a* can be given an attribute of "approver." In the shown examples, both accounts 302 have the approver attribute 312. In other implementations only the parent account 302*b* need be given this attribute since the head of household attribute 302*a* can be designated to include the approver status, or the approver status can be selectively associated with only some parent accounts in each family account structure 300. The approver status can allow the user of the associated parent account to approve particular activities, actions, and/or requests of the user of a child account (or other supervised account), e.g., requests for permission from a child account to access particular information, a website, an application, etc. In some implementations, the approver status can also provide other privileges, e.g., particular types of control over a child account, etc. In some implementations, the approver status can allow approval ability for the parent user for requests from other parent accounts or other accounts that do not have approver status.

Child user accounts 304 can be provided at a lower hierarchical level in the family account structure than the parent accounts 302. Child accounts 304 can include any of a number of different attributes, including a child attribute to designate them as child accounts. In some implementations, certain attributes, e.g., head of household 310 and approver 312, cannot be associated with a child account 304, while other attributes can be associated with a child account and not with parent accounts. For example, child user accounts 304 can include one or more descriptive attributes. In this example, child account 304a has a "threshold age or over" attribute 316, and child account 304b has an "under threshold age" attribute 318, indicating the age of the child user of the respective child account. In this example, having an age equal to or over the threshold age in one case, or under the threshold age in the other case, provides different account privileges to a child user. For example, the under threshold age child account 304b can be considered at a lower level of the account structure hierarchy than the threshold age or over child account 304a. Various implementations can use any desired one or more threshold age(s) to distinguish supervised status, access privileges, or other capabilities and/or characteristics of child accounts, and/or can use other child user characteristics or attributes.

For example, child users under a threshold age can be associated with less access privileges to resources of the server system, to applications running under the child account, to information from online sites, to communication with other users, etc., than child users of the threshold age or over. If the user of a child account 304b wishes to perform an access or action requiring such personal information use, collection, or disclosure, the user is prohibited by the system unless consent is obtained from a parent user of a parent account 302 (or from another account of the structure 300 having approver status). Consent can be obtained, for example, using device requests, parent user responses, and other features in some examples herein.

In some implementations, restrictions to access of the child user of child account 304a and/or 304b can be variable based on preferences of the parent users of the parent accounts. Other implementations can impose additional or other attributes pertinent to other access restrictions for the child user of the child account, e.g., different age requirements, other characteristics of the child users, etc. The child accounts can include other attributes as well, e.g., statuses, descriptors, or other attributes.

In some implementations, additional types of user accounts can be included in the family account structure 300. For example, one or more aunt or uncle user accounts 320 can be included in the family account structure, and can be used by one or more uncle or aunt users of the family social group and of the server system. Similarly, one or more grandparent user accounts 322 (e.g., grandmother or grandfather) can be connected to the family account structure and associated with grandparent users. An uncle/aunt account 320 and grandparent account 322 can include attributes 326 indicating roles of these accounts. In some implementations, these types of accounts 320 and 322 can be provided with less privileges than the parent accounts, but more privileges than the child accounts. In one example, the parent accounts may not be provided with any control or monitoring abilities over the accounts 320 and 322, but the accounts 320 and 322 may not have an approver status. Additional family relation accounts can be included in the account structure 300, e.g., if desired by the head of household parent user, e.g., nephew accounts, cousin accounts (for cousins of a predetermined degree, e.g., first cousins, second cousins, etc.), in-law family member accounts, etc.

Similarly, one or more other user accounts (e.g., account 324) can be included in the family account structure 300 in some implementations, each having its own attributes 326. The other user accounts 324 can be associated with users approved and added by the controlling parent account(s). These users can be any of various types of users, e.g., close friends to the family, guardian, legal representative, etc. Such accounts can be considered family accounts to allow them to be sent family messages, communications, applications, or other data, for example, and to easily communicate or send data to the entire family in the structure 300 or one or more specific family members in the structure 300. Such accounts can also be assigned attributes as desired by the controlling user.

In some implementations, the family account structure can have structure attributes 328 that can relate to the family account structure and/or all the accounts of the account structure. For example, a name of the family account structure and other characteristics can be stored in attributes 328.

The family accounts of family account structure 300 can be assigned role labels similarly as described above for FIG. 2. In some implementations, family member labels can be substituted for corresponding user account names or identifiers to allow more relevant and/or streamlined communications. For example, a parent-mother family user account can be referred to with a "mom" or "mother" role label by a child user of that family to communicate with the parent user of that parent account. A request from an application to communicate with a "mother" account with reference to a particular child account can be routed to the parent user account corresponding to the "mother" label in the relevant family account structure, without having to reference the mother account directly (e.g., teachers can send information to parents of children that are in the teacher's school class without having to know the parent account name or email address). In some implementations, stored user preferences can determine which labels are to be used in output on a device. For example, a parent user of a parent account can set up a child account for a child user to have each reference to a parent account output by the device be substituted with the appropriate role label of "mom" or "dad."

In some implementations, a system can determine which user account corresponds to a particular role based on other information. For example, if the system is given a request for a "mother" account, the system can check for an account having supervisory or parent status, and check for an account having a user with a female gender. Similarly, in some implementations the system can determine a role label for an account, e.g., assign "mother" and "mom" labels to a parent account having a user with a female gender.

In some implementations, e.g., example implementations described below with reference to FIG. 5, one or more supervised contact lists 330 can each be associated with an associated child account 304. In some implementations, some of the child accounts 304 can be associated with a supervised contact list 330, and other child accounts 304 are not associated with lists 330. In some implementations, one or more supervised contact lists 330 can be associated with the account structure 300, and any qualifying child account or other type of qualifying user account is associated with the supervised contact list(s) 330 of the account structure 300.

In some examples, child account 304*b* for a child user under the threshold age can be provided with more supervision from supervisor accounts, and can accordingly be associated with a supervised contact list 330. Child account 304*a* for a child user of the threshold age or older can have no associated supervised contact list. For example, as described below, supervised contact list 330 can list a set of users (e.g., user accounts) which have been approved by a supervisor user of a supervisor account such that the associated child user account can interact in various device activities involving these users. The supervised contact list 330 can alternatively or additionally list a set of users which have been disapproved by a supervisor user and are prohibited from interacting or involvement with the associated child user account. In some examples, each supervised contact list 330 can be stored in association with its child account 304 and can include data including information of the listed users, e.g., identification information, phone numbers, network addresses, physical addresses, history log information describing interactions with the supervised account, and/or other data, e.g., as described in examples below.

Figure 4:
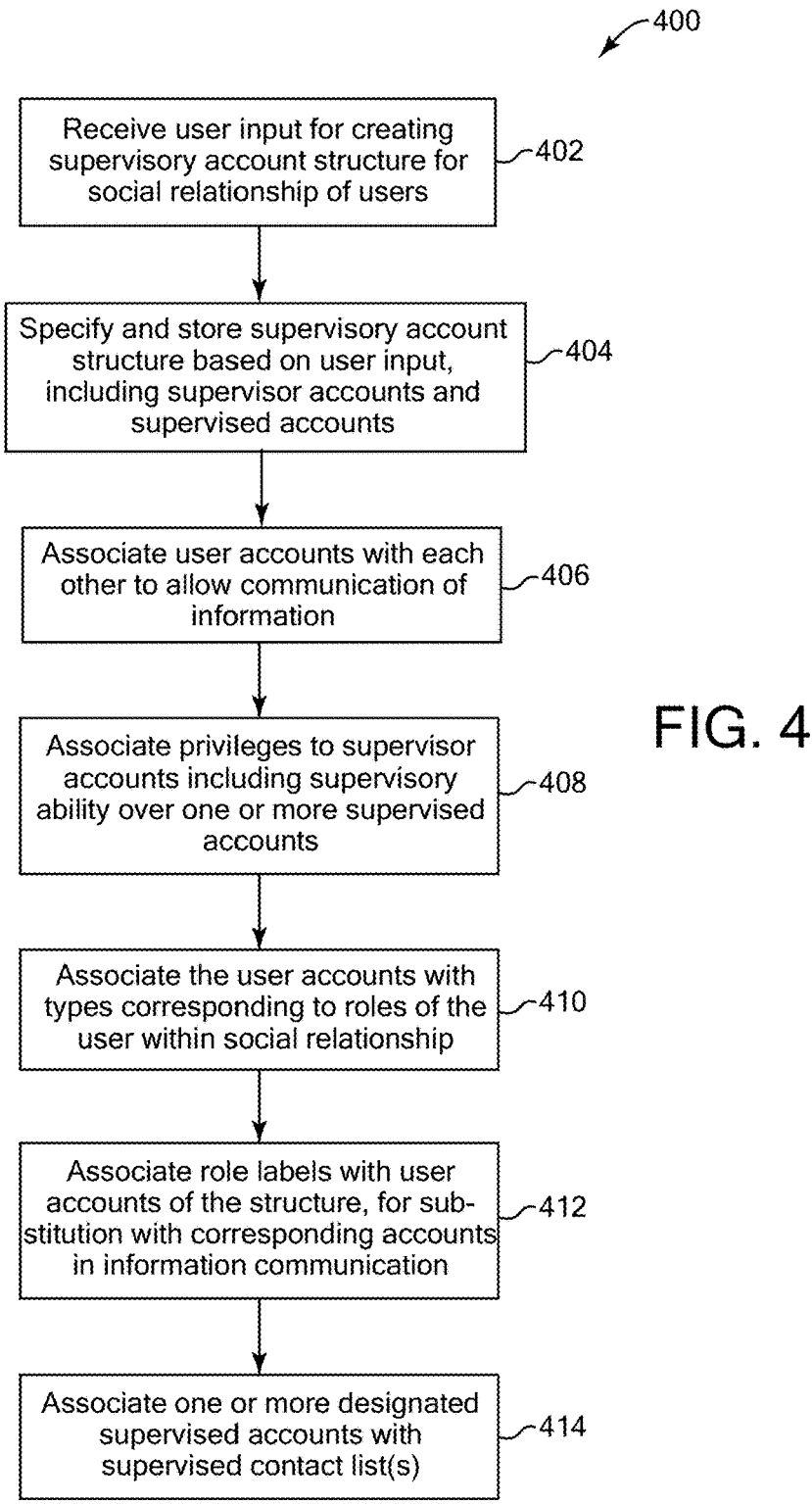
FIG. 4 is a flow diagram illustrating an example method for providing a supervisory account structure, according to some implementations.

FIG. 4 is a flow diagram illustrating one example of a method 400 for providing a supervisory account structure, according to some implementations. In some implementations, method 400 can be performed, for example, on a server system 102 as shown in FIG. 1. In other implementations, some or all of the method 400 can be performed on a system, e.g., one or more client devices, and/or on both a server system and one or more client systems. In described examples, the performing system includes one or more processors or processing circuitry, and one or more storage devices, e.g., a database 106, memory, and/or other storage. In some implementations, different components of one or more servers and/or clients can perform different blocks or other parts of the method 400.

Method 400 can be implemented by computer program instructions, software instructions, logic, and/or code, which can be executed on a computer, e.g., implemented by one or more processors, e.g., microprocessors or other processing circuitry, and can be stored on a computer program product including a non-transitory computer readable medium or computer readable storage medium, e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, method 400 can be implemented in hardware (logic gates, etc.), or in a combination of hardware and software.

In block 402, user input is received to create a supervisory account structure for a relationship of users. The user input can be received from a user who will be a controlling user (or organizing user) of the supervisory account structure. In some examples, the user input can specify various information for use in creating the account structure, e.g., the number of accounts to be included in the structure, the user name(s) to be associated with each account, the hierarchical level of each account, the name of each account, the type of each account (e.g., supervisor, supervised, parent, child, etc.), statuses and attributes associated with each account, specific privileges associated with particular accounts, default passwords for each account, etc. The user input can be provided by the user via any one or more input techniques, e.g., selecting a file of the information to be received, inputting the information in a displayed user interface of a client device using an input device, designating a program to send the information based on one or more conditions, etc.

In block 404, a supervisory account structure is specified and stored based on the user input received in block 402. For example, the supervisory account structure can include one or more supervisor accounts and one or more supervised accounts. The supervisory account structure can include any other information received from the user in block 402, e.g., attributes, user names, privileges, types, and hierarchical level associated with each account. The account of the controlling user can be provided with a control status attribute, allowing the controlling user to modify the supervisory account structure, e.g., add new accounts to the structure, delete accounts in the structure, delete the structure, etc. In some implementations, supervisor and supervised accounts can be associated with particular user roles in a represented social group. For example, the supervisory account structure can be a family account structure, and each user account can be associated with a different user in a particular family of the controlling user, including parents, children, and other family members. Other implementations can associate the supervisory account structure with other social groups of users, e.g., businesses or other organizations.

In block 406, the user accounts of the supervisor account structure are associated with each other to allow the user accounts of the structure to send and receive information related to the social group and relationship of users represented by the supervisory account structure. For example, if one of the user accounts in the account structure receives information related to the represented relationship of users (e.g., from client devices, applications, etc.), then that information can be sent to all of the other accounts in the structure. In some implementations, received information can be sent to designated accounts in the structure associated with particular roles or types in the social user relationship, if such received information specifies or otherwise indicate those roles or types. Similarly, information sent by one account of the structure to the user relationship or user group can be automatically sent to all of the accounts of the account structure, or designated accounts of the structure if the information specifies particular roles or types associated with those accounts. In one example, the user social group is a family social group, and information intended to be received by the family is received by all the accounts in the family structure, while information sent to the family from one of the accounts is sent to all of the other family accounts in the family account structure. Similarly, information received by one or more of the accounts which specifies one of the family roles (e.g., "parent" "mother", etc.) with reference to a child account, is sent to the family account in the structure that corresponds to the designated role.

In block 408, privileges may be provided to the supervisor accounts in the supervisory account structure, including supervisory ability over one or more supervised accounts in the same supervisory account structure. The supervisor accounts can be given supervisory ability including monitoring, control, etc., over particular supervised accounts and/or over devices associated with those supervised accounts. In one example, the supervisory ability can be granted to supervisor accounts for supervised accounts having one or more particular attributes. In some examples, a supervised client device can be associated with a supervised account over which the supervisory abilities are granted, where the association can be stored in the supervisory account structure. The supervised device would thus be subject to the supervisory abilities of the supervisor accounts while the supervised device was associated with the supervised account. In other implementations, a user of a supervised account can log into the account using a suitable device, and that device can be subject to the supervisory abilities while the user is accessing the supervised account with that device.

In some implementations, users of supervised accounts are given requests for consent by the supervised user for the supervisory abilities given to one or more supervisor accounts over the supervised account. For example, supervisory abilities over the supervised account can be denied to the supervisor account unless such consent is received from the user of the supervised account. Such consent requirements can be used in particular implementations, e.g., an account structure for a group or organization, and may not be appropriate in some implementations or applications. For example, an account for a child user under a particular age (e.g., 10, 13, etc.) may not be required to provide consent to allow supervisory abilities over that account by a parent user account.

In some examples specific to a family account structure, a child account can be a supervised account and a parent account in the family account structure can be provided the supervisory abilities over one or more child accounts in the same family account structure. For example, the supervisory abilities can be granted over child accounts for child users that are under a threshold age, while child accounts for children of threshold age or over can be made not subject to any or all of the supervisory abilities, or may be subject to the supervisory abilities to a lesser degree. In various implementations, other characteristics and/or actions of a user or account can be examined to determine whether to assign supervisory abilities to a supervisor account over that user's (supervised) account. The supervisory abilities can allow a parent user of a parent account to monitor predefined activities of the child user while using the child account and a device, e.g., accessing sites or services, communicating with other users, etc. The abilities can allow control including control over the child account (e.g., settings including user name, password, attributes, etc.) and over the device the child is associated with or is currently using (e.g., settings and functions of the device). In some implementations, the supervisor accounts can also be granted greater access to resources of the server system than the supervised accounts, e.g., having a greater allocated storage space for storing personal data, being able to access more types of server services (email, document creation or editing, image and movie editing, business services, etc.), etc.

In block 410, the user accounts of the supervisory account structure can be associated with types corresponding to roles of the users within the social relationship. For example, for a family social relationship, roles of mother, father, child, etc. can be assigned to the user accounts based on input from the controlling user or other information sources as to which user accounts correspond to which users having particular roles in the family social relationship.

In block 412, role labels are associated with user accounts in the supervisory account structure based on the associated roles of the user accounts, where the role labels can be substituted with the corresponding accounts in the supervisory account structure in information communication and transactions of the server system. For example, as described above, role labels can be descriptive in relation to a more specific type of supervisory account structure. In an example of a family account structure, role labels can include "parent," "child," "mother," "father," "mom," "dad," etc. which correspond to roles in the family, and one or more of the user accounts can each be associated with one or more corresponding role labels. If an application or user has a reference to an account (e.g., a child account) and wishes to communicate with a parent account, the application or user can refer to a role label and the method can automatically connect the application or user to the actual account in the family account structure that corresponds to the role label. In one example, an application can request to contact a "parent" or "mother" role label for a particular child, and the system can find the particular child account, find the target account having the referred role label in the same family structure as the child account, and connect the application or user to the target account.

In block 414, one or more designated supervised accounts are associated with supervised contact list(s). For example, each designated supervised account can be associated with its own respective supervised contact list. Other implementations can provide a supervised contact list that is associated with multiple supervised accounts. In some implementations, the designated supervised accounts can be indicated by input received from the controlling user. In an example using a family account structure, the controlling user can indicate that child accounts for child users under a predetermined age (e.g., age 13) are designated to be associated with supervised contact lists. Alternatively, the types of supervised accounts receiving associated supervised contact lists can be a default type of account depending on one or more attributes assigned to the accounts. The controlling user can also populate the supervised contact lists with one or more users (e.g., user identifiers, e.g., user account names, network addresses, etc.), e.g., by browsing through the supervisor user's own contact lists, the supervised user's personal contact lists, or various accessible directories or search tools and finding trusted users to place on the supervised contact lists. Preferences for each contact list can also be determined based on input from the controlling user, and/or modified at a later time based on later input. Some examples are described below with reference to FIGS. 5-11.

Any (or a designated) supervisor user of the account structure can edit the supervised contact lists at a later time. In some implementations, a change made to one supervised contact list of one supervised user is automatically duplicated for other supervised contact lists of other supervised accounts in the same supervisory account structure. In other implementations, each supervisory contact list's changes are independent of other supervisory contact lists in the same supervisory accounts structure. Some implementations can cause some categories of changes to be automatically made across all supervised contact lists of an account structure, while other categories of changes are only made to a subject contact list. For example, deletions of users from an approved contact list of one child user can be automatically performed by the system to the approved contact lists of all child users in that family account structure, and additions of users can be made only to the changed supervised contact list.

A variety of applications and functions can be used with the supervisory account structure. The system can set up multiple supervisory account structures based on input from different controlling users, where the accounts in each structure are separated from other accounts in other supervisory account structures with respect to references to the user social group which the structures represent. For example, the accounts of one family account structure representing a particular family can be made separate from other family account structures representing other families, e.g., member users of one family account structure do not access the privileges, sharing and accessibility, attributes, labels, and other features of other family account structures used between members. In some implementations, a particular user account can be a member of one or more supervisory account structures. For example, a particular user account can be a parent account in one family account structure and can be another type of account (e.g., a friend account) in a different family account structure.

Figure 5:
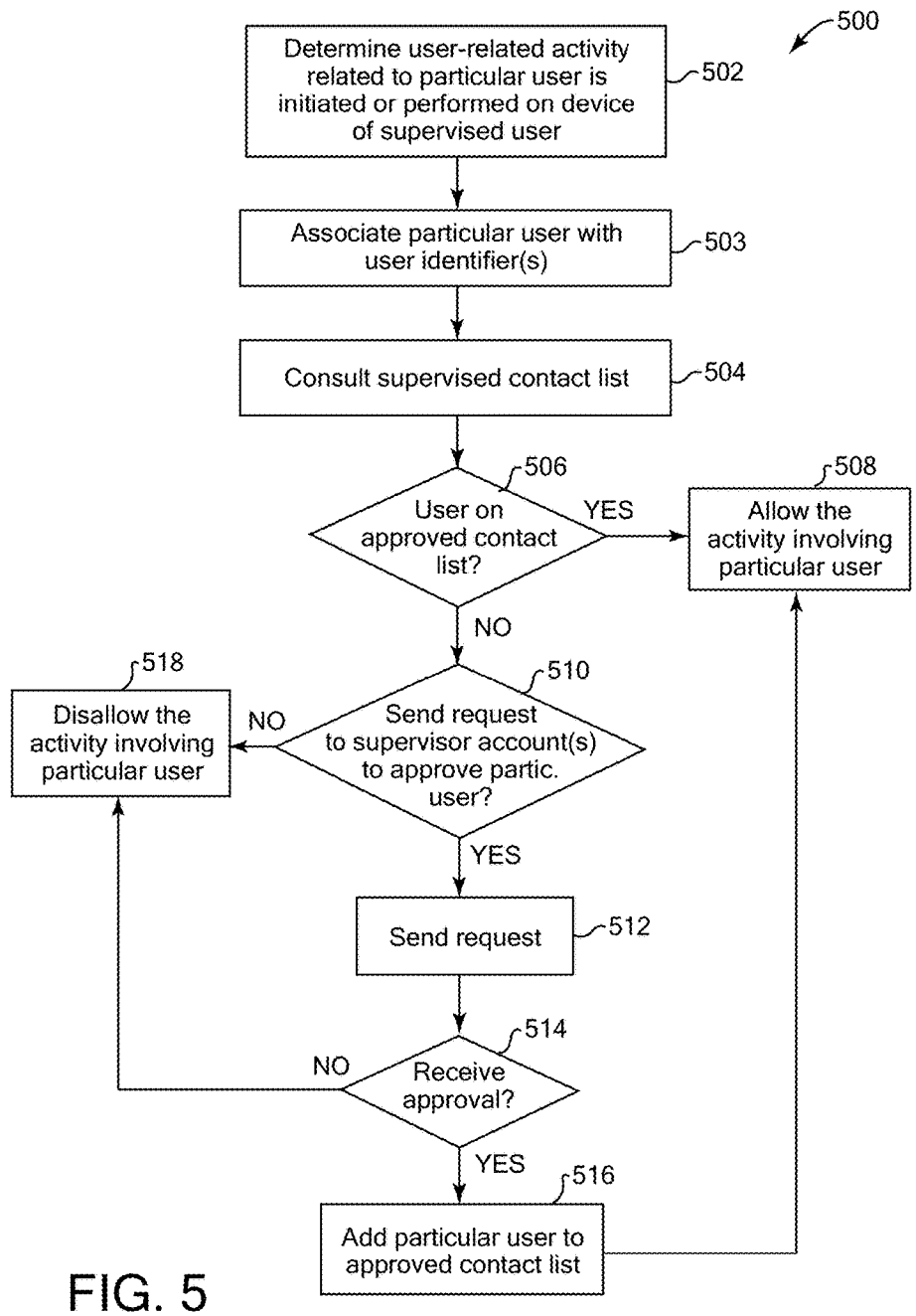
FIG. 5 is a flow diagram illustrating an example method for providing supervised contact list features usable with a supervisory account structure, according to some implementations.

FIG. 5 is a flow diagram illustrating an example method 500 for providing features related to a supervised contact list and which are described with reference to a supervisory account structure, according to some implementations. In this example, activities related to a user of a supervised account and one or more other users can be checked against a supervised contact list to determine whether the activities are available for the supervised user account.

In some implementations, method 500 can be performed, for example, on a server system 102 as shown in FIG. 1. In other implementations, some or all of the method 500 can be performed on a client system, e.g., one or more client devices, and/or on both a server system and one or more client systems. In described examples, the performing system includes one or more processors or processing circuitry, and one or more storage devices, e.g., a database 106, memory, and/or other storage. In some implementations, different components of one or more servers and/or clients can perform different blocks or other parts of the method 500. In some examples, at least some blocks of method 500 can be implemented on a client device of a user, e.g., in an application program or other software running on the client device, in a hardware implementation of a device, etc. Some examples can use a server system to perform or facilitate some blocks, e.g., for obtaining an updated supervised contact list, sending a request to a supervisor account, receiving and forwarding an approval, allowing and disallowing activities on any device used by a supervised account based on the supervised contact list, etc.

In block 502, the method determines that one or more supervised user-related activities related to a particular user are pending, e.g., the activity has been commanded, initiated, or partially performed, on a device operated by a user ("supervised user") associated with a supervised account (e.g., a "supervised device"), and, for example, the activity has yet to be completed. The supervised account can be included in a supervisory account structure that includes multiple user accounts as described above, e.g., a family account structure in some examples. In some implementations, the user-related activities can be performed or initiated using the supervised device, e.g., selected by the supervised user using one or more application programs or other programs operating on the device. In some examples, the device operated by the user can be a client device which the supervised user has logged into or is otherwise using the associated supervised account.

In some implementations, it can be determined whether an activity on the supervised device is a supervised activity that requires examining a supervised contact list. For example, some types of activities can be defined by the supervisor user(s) to not require examining the supervised contact list, and these activities can be automatically allowed to be performed by the supervised user of the supervised account. For example, the types of activities with other users that require examining and applying the supervised contact list can be specified in stored preferences or attributes for the supervised account and/or supervised contact list of the supervised user. Alternatively or additionally, such preferences or attributes can specify the types of activities that do not require using (e.g., applying) the supervised contact list. Some implementations can store one or more defined characteristics of activities that, if present for a detected activity, allow disregarding the supervised contact list. For example, preferences or attributes can specify that activities occurring during particular times of day or days of month, at particular geographical locations, and/or during particular defined events or types of events can be allowed to continue for the supervised account without applying the supervised contact list.

In some examples, the supervised activities related to a particular user can include the supervised user initiating a communication with the particular user, receiving a request for communication from the particular user, or communicating with the particular user using devices of the supervised user and the particular user. In some examples, the device operated by the supervised user can send out a request to initiate a call, e.g., a video call, voice call, or text chat. In additional examples, the request can initiate another type of communication, e.g., a text message, video message, or other communication of content in which the supervised user exchanges information with the particular user. In some examples, a voice call, video call, or other form of communication can be commanded or received by the supervised user or particular user based on various options available to the supervised user or particular user in a communication application interface. For example, a video call can cause each device of the call to send and receive audio data representing the users' voices captured by their respective devices (e.g., using microphones of the devices), and to send and receive visual or video data describing visual images captured by their respective devices (e.g., captured by cameras of the devices). In other examples, voice phone calls can transmit audio data, text chat can send text characters, graphical images and symbols, emojii, etc.

Other communications can be supervised user activities, including receiving or sending offers to sell goods and services, advertisements, requests for information between the supervised user's device and the particular user's device, and requests to buy products or services between the supervised user's device and the particular user's device. In one example, the device used by the supervised user can receive a request for a communication from the device of the particular user, including any of these types of communications. In still other examples, the communication may have been established between the devices of the supervised user and the particular user. In some cases, the supervised user device may have initiated, received, or be included in a communication with multiple particular users. The communication can be over one or more communication networks, e.g., phone networks, data networks (e.g., Internet, local Ethernet, peer-to-peer networks, etc.), wireless networks (e.g., WiFi, Bluetooth®, peer-to-peer, etc.), cell phone networks, etc. In some examples, the supervised user and the particular user can be initiating a communication or communicating with their operated devices using user interfaces displayed on their operated devices.

In some implementations, the supervised activities related to a particular user can include the supervised user adding (e.g., attempting to add) one or more user identifiers of the particular user to a contact list of the supervised user, e.g., a personal contact list, user group in a networking service (e.g., social networking service or other service), or other set of contacts or addresses of users for the supervised account. For example, the supervised user can, via the supervised account, select to add the particular user to a personal contact list of the supervised user that is stored in association with the supervised account of the supervised user. In some implementations, the personal contact list can be a separate list from the supervised contact list, e.g., can temporarily include some users not listed on the supervised contact list. In some examples, the supervised user may want to add the particular user's identifier to a personal contact list used in a calling application for calling users, e.g., where the user can select a user listed in the contact list to cause the device to initiate a call to the selected user. The supervised user may want to add the particular user to a contact list or one or more user groups in a social networking service or other network service, e.g., a user group that allows the particular user's account to access the supervised user's home page of the social networking service, uploaded and input content (ratings, comments, replies, postings, etc.), logged activities, and other information, and/or allows the particular user's account to automatically receive updates related to content or activities performed by the supervised user and recorded on the network service.

In some implementations, the supervised activities related to a particular user can include playing a game or otherwise interacting in a virtual or electronic environment with the particular user. For example, the supervised user can set up a game using his or her device, e.g., where the game may be implemented on the supervised user's device and/or on a server system in communication with the supervised user's device. The supervised user can invite the particular user to join the game such that the particular user's device connects to a game session set up by the supervised user's device. For example, the game can be provided by a connected server device or by a client device such as the supervised user's device, and the particular user can interact with the supervised user within the game environment. Alternatively, the particular user may be able to view the supervised user's game in a displayed list of games, an online lobby, or other service, such that the particular user's device can join the supervised user's game. Similarly, the particular user may set up a game and the supervised user may have commanded or selected to join the particular user's game. In still other implementations or cases, the devices of the supervised user and particular user can communicate with each other to initiate a game in which both devices are automatically participating.

In some implementations, the supervised activities related to a particular user can include the initiation of group interactions or associations. For example, the supervised user may wish to join a group that also includes the particular user, e.g., join a group headed by the particular user or in which the particular user is a member. In some examples, the supervised user may only be allowed to join the group if one or more approved users are already in the group, as described below.

Some implementations can use supervised activities as defined in a stored permissions framework associated with the supervisory account structure, e.g., stored in a storage device accessible to a device (e.g., server device) implementing the account structure. For example, a set of activities can be defined in the permissions framework which require permission from a supervisor account before a supervised account is allowed to perform those activities on a device. Such activities can be referred to by the method 500 to check for activities which involve or are otherwise related to other users and which have designated permission statuses, e.g., requiring immediate permission from a supervisor, requiring eventual permission, not requiring permission, etc.

For example, the supervised user's device(s) can be examined by the implementing system for occurrence of the relevant activities, examples of which are described above, or the system can be notified when supervised activities occur, e.g., receive notifications at a server from program(s) running on client device(s) that detect the activity and send the notifications. In some implementations, the supervised user may initiate the activity on the device, and if the activity qualifies as a supervised user-related activity described above, the performance of that activity may be paused on the device (if needed) until relevant blocks of method 500 are resolved and the device is either allowed to continue with the activity, or the activity is disallowed and is terminated on the device.

In block 503, the particular user determined in block 502 is associated with one or more user identifiers. For example, in some implementations, the particular user can be associated with a user identifier that is a user account name, a user name, an email address, a network address, a company name, and/or other designation. For example, the particular user may have been identified in the activity performed on the supervised device as a user name or user account name, which can be used as a user identifier. Some implementations can associate the particular user with an identifier (e.g., unique identifier) used internally to the method 500 and which, for example, may be unused outside the method 500.

In some implementations, the particular user can be a user having a user account that is external to the supervisory account structure, e.g., a user account on the same server system or service as the supervisory account structure, in a different supervisory account structure, and/or on a different server system connected via network 130. Some implementations can treat any entity able to communicate over computer networks as a particular user, e.g., a person, business, organization, automated computer algorithm, artificial intelligence, agent, bot, or network address having automated requests and responses.

In block 504, a supervised contact list associated with the supervised user account is consulted. One or more of the user accounts in the supervisory account structure can each associated with its own supervised contact list, or associated with its own set of multiple supervised contact lists in some implementations. In some examples, each supervised account meeting one or more predetermined conditions can be associated with its own supervised contact list. For example, in a family account structure, the conditions can include a child account associated with a child user that is under a predetermined age, e.g., 10 years, 13 years, etc. In some implementations, supervised user accounts in the account structure are associated with supervised contact lists that are managed by one or more supervisor accounts in the account structure. For example, a supervised contact list may be able to be managed by all supervisor accounts in the account structure, or alternatively by particular one or more of the supervisor accounts that have been designated for managing or otherwise associated to that supervised account. In some examples, such a designation or association can be stored as associated with the supervised account and/or the supervisor account, e.g., as an attribute. The supervisor users of these managing supervisor accounts are able to add, delete, or modify the listed users, conditions, and other characteristics of the supervised contact list for the supervised account.

In some implementations, the supervised contact list includes an approved contact list that specifies all users (e.g., user identifiers) who are approved by a supervisor user. For example, the approved users can be users who are allowed to be involved in supervised user-related activities of the associated supervised account as described above for block 502. Thus, the implementing system can determine whether the particular user is present as a listed user on the supervised contact list. In some implementations, users are listed on the supervised contact list by storing their associated user identifiers on the list. For example, in some implementations, a listed user may be associated with multiple different user identifiers, and one or more of the multiple user identifiers can be stored in the supervised contact list. In some implementations, a single identifier can be stored on the supervised contact list, and the single identifier can be associated with multiple user identifiers associated with a user, e.g., in a stored list or table, so that a particular user can be identified via the single identifier.

In some implementations, all of the users of the supervised account's supervisory account structure are automatically included on the approved contact list. Additional users external to the supervisory account structure can be added to the list by one or more supervisor users via supervisor accounts. For example, a supervisor user can add to the approved list (or approve the adding of) persons including friends of the supervisor user and/or friends of the supervised user, neighbors, teachers, and/or other trusted individuals. In some implementations, a user interface displayed on the supervisor user's device can allow a supervisor user to add whole categories of persons, e.g., the entire current school class of a child user or other defined group.

In some implementations, the supervised contact list can also or alternatively include a disapproved contact list, and/or a disapproved contact list can be maintained separately from an approved contacts list. The disapproved contact list lists users who are not allowed to be involved in supervised user-related activities. The disapproved contact list can be consulted to determine whether the particular user (e.g., user identifier) is present on the list.

In addition, in some implementations, it can additionally be determined in block 504 whether the particular user meets one or more predetermined conditions associated with the supervised contact list, and if such conditions are met, the particular user can be considered to be a listed and approved user (or a disapproved user, for the disapproved list), even if the particular user is not currently listed on the supervised contact list. For example, the system can check such conditions if the particular user is not found on the approved contact list, and if the particular user meets the conditions, the user is considered approved. In some implementations, one or more designated supervisor users can be allowed to designate or define conditions for automatic addition of users to the supervised contact list, either temporarily (e.g., approved just for the current activity, or just for a predetermined number of such activities), or permanently. Such conditions can include any of a variety of conditions, e.g., conditions relating to the characteristics of the particular user (e.g., particular user goes to same school/sports/club as supervised user, is in a certain age range, is currently located at a particular geographical location, etc.), type of activity (e.g., video call, voice call, text chat, adding user name to contacts, game, type of game, etc.), time of day or day of week, etc. In some examples, the conditions can specify that the particular user is permanently added to the approved contact list if the particular user is part of the same class at school as the supervised (e.g., child) user. The particular user is temporarily considered an approved user only for this activity if the particular user goes to the same school as the supervised user (e.g., faculty or student) and the particular user is currently located at the school or currently located close to (e.g., within 20 feet) of the supervised user. Such conditions can allow, in some cases, the request for approval described below for blocks 510-514 to be omitted or avoided for particular users that are not present on the supervised contact list.

In some implementations, the users listed on the supervised contact list (e.g., periodically, when indicated by a supervisor user, etc.) can be checked against a set of conditions to determine whether the users should remain on the list or be removed. For example, if a user is no longer going to the same school class as the supervised child user, that user can be removed from the approved contact list (e.g., all user identifiers associated with that user can be removed from the approved contact list).

In block 506, it is determined whether the particular user is on an approved contact list associated with the supervised user account, or whether the activity is otherwise permitted. For example, it can be checked whether the user identifier associated with the particular user is on an approved contact list of the supervised contact list. In some implementations, if multiple user identifiers are associated with the particular user, then the approved contact list can be checked for any of the known user identifiers associated with the particular user. For example, in some implementations, users can each have multiple stored associated identifiers accessible by the system implementing block 506.

Thus, after consulting the approved contact list in block 504, it can be determined whether the particular user has been designated as a pre-approved user. If the particular user is present on the approved contact list, then the activity is generally approved by the associated supervisor users of the supervised account based on the particular user (in some implementations, the activity itself may also need to be approved, e.g., based on a separate stored list of approved types of activities). In some implementations, it can also or alternatively be determined whether the particular user (e.g., a user identifier associated with the particular user) is present on a disapproved contact list, e.g., a disapproved user list of the supervised contact list, as a user prohibited from involvement in supervised user-related activities of the supervised user account. Examples of method implementations according to a disapproved contact list are described below.

If the particular user is present on the approved contact list, then in block 508 the supervised activity related to the particular user is allowed to start or continue by the supervised user on the supervised user's device. For example, if the activity was the addition of the particular user (e.g., a user account or other identifier) to a personal contact list, user group, game, etc. for the supervised account, then such activity is allowed and the particular user identification or account is added and/or communicated with. If the supervised user and particular user devices intend to communicate with each other for the activity, then this communication is allowed. In some examples, a voice call or video call is allowed to connect, a text message allowed to be sent or received, etc. In some examples, a server system implementing block 508 can send one or more commands to the supervised user's device to allow the activity. If the supervised user's device implements block 508, that device can enable the activity.

In some cases or implementations, for supervised activities including communication between the supervised user device and the particular user device, to actually connect, the communication may require that it be allowed by devices on both ends, e.g., for both users. For example, if both the supervised user and the particular user are supervised and have supervised contact lists in their respective supervisory account structures, then each user is required to appear on the other user's approved contact list (or be approved in some other way, e.g., with supervisor user permission on both ends) for the communication to be enabled and actualized. Such a feature can provide added security for communications involving supervised users, e.g., child users under a predetermined age, since each user is required to be trusted by supervisor users of the other user.

If the particular user is not present on the approved contact list in block 506, then in block 510 it is checked whether to send a request for one or more supervisor accounts to approve the particular user. For example, in some implementations no such request is performed to allow the resolution of the user's activity to be immediate and without pause for approval from a supervisor user. In other implementations, such a request is performed to, e.g., allow supervisor accounts to have more involvement in the contact of supervised accounts with other users. Some implementations can provide conditions to cause a request to be sent to the supervisor account(s) if the conditions are met. In some examples, if the activity is of a certain type (e.g., voice call or video call), then the request is not sent, while if the activity is a different type (e.g., adding the particular user to a user's personal contact list or user group), then the request is sent. Conditions can also include characteristics of the particular user, such that if the particular user has one or more predetermined characteristics, the request is sent (or is not sent if other characteristics are present). In one example, if the particular user is a member of a particular predefined website, group, organization, school, etc., then a request can be sent, while a request is not sent if the particular user does not have such membership. These conditions can be reversed in other examples, and/or other or additional conditions can be imposed.

Some implementations can send a notification to the supervisor account(s) instead of a request, e.g., notifying the supervisor user of the particular activity being performed with the supervised account, the time the activity occurred, the particular user's descriptive information (user name, any background information, etc.). The supervisor user can then have options to take an action, e.g., respond immediately, if desired, or take action at a later time (e.g., add the particular user to the supervised contact list, view the supervised account's activities, modify the supervised user's personal contact list, etc.).

If a request is to be sent as determined in block 510, then the method continues to block 512 in which the request is sent to one or more supervisor accounts of the supervisory account structure of which the supervised account is a member. If more than one supervisor account is designated for approvals of supervised user-related activities in method 500, then the request can be sent to all such supervisor accounts. Alternatively, the request can be sent to one supervisor account. For example, the request can be sent over one or more networks from the supervised user's device to the supervisor accounts, which can be stored at a server system, client device, etc. If the supervisor user(s) are currently using devices, then the request can be sent to those devices, e.g., to be presented to the supervisor users or stored in a mailbox storage feature for later viewing by the supervisor user. The request can be sent to a supervisor user's device via one or more server devices in some implementations. In some implementations, a context of the request can also be sent to the supervisor user account, e.g., a description of the particular activity the supervised user is attempting to perform, one or more screen capture images of the supervised user's device screen, etc.

In block 514, it is checked whether an approval has been received from a supervisor user of a supervisor account in response to the sent request. For example, the approval can be sent as data over one or more networks to a server system and/or to the device used by the supervised user. In some implementations, any single supervisor user's approval response is sufficient to qualify as an approval. In other implementations, multiple or all supervisor user's approvals can be required to be considered an approval of the activity. If an approval has not been received, then the method can continue to check for an approval at block 514 (e.g., while performing other blocks simultaneously if needed). In some implementations, block 514 can continue checking for an approval until one or more predetermined conditions are met, e.g., a predetermined time period expires, and/or the supervised user stops attempting to perform the user-related activity for which approval was requested. If such conditions are met, it can be assumed that approval has not been provided. Alternatively, the supervisor user using the supervisor account can send a denial in response to the request for approval. In such cases of no approval, the method continues to block 518, described below.

If an approval is received, then in block 516 the particular user is added to the approved contact list associated with the supervised account, e.g., one or more user identifiers associated with the particular user can be added to the approved contact list. For example, this can allows future supervised user-related activities (e.g., similar to those described above for block 502) performed by the supervised user with this same particular user to be quickly approved based on checking the approved contact list. The method also continues to block 508 to allow the user-related activity related to the particular user to start or continue by the supervised user on the device similarly as described above.

If in block 510 the method is not to send a request for approval after determining that the particular user is not on the approved contact list, or if approval is not received in block 514, then the method continues to block 518. In block 518, the user-related activity is disallowed (terminated) on the device that the supervised user attempted to perform or is currently performing. For example, the supervised user's device can disconnect the user from any call that has been initiated or connected, can deny the user's action to add the particular user to a contact list, user group, game, etc. In some implementations, one or more status messages can be displayed on the device of the supervised user, indicating the disallowed status. Some implementations can also add the particular user to a disapproved contact list (if present), as described below. In some implementations, a server device can send one or more commands to the supervised user's device instructing the activity be disallowed on the supervised user's device.

In some implementations, the supervised activity can be allowed to occur even if the particular user is not found on the approved contact list, e.g., block 512 can be followed by block 508. For example, the method can request approval in block 512 but this request does not interrupt the activity of the supervised user, who can continue with the activity regardless of particular user status. Thus, in some implementations, the request can be considered a notification, such that the supervisor user can read the request and respond to the request asynchronously, e.g., when convenient for the supervisor user. A response that is an approval of the particular user can add the particular user to the approved contact list, and a response that is a rejection of the particular user can lead to no change of the approved contact list. In some implementations, the rejection response can cause the particular user to be removed from the approved contact list if, under particular conditions, that user had been previously stored in the list. In some implementations, the rejection response can cause the particular user to be added to a disapproved contact list.

In implementations using a disapproved contact list, then some or all of blocks 506-518 can be appropriately performed according to such a disapproved contact list instead of the approved contact list shown. For example, upon finding the particular user on the disapproved list in block 506, the disallowing block 518 can be performed. In some implementations, if the particular user is not on the disapproved list, then the activity can be allowed as in block 508. In some implementations, if the particular user is not on the disapproved list and is not on any approved contact list (if present), the request for approval of the particular user sent in block 512 can be sent to one or more supervisor accounts, such that if approval is received, the activity is allowed as in block 508.

Some examples of applications and interfaces providing features using a supervised contact list and supervisory account structure are described below with reference to FIGS. 6-11.

In other implementations, supervised contact lists in any of the various described implementations can be used on systems and devices without the use of a supervisory account structure described above. For example, the supervised contact lists can be assigned to users or accounts via other account structures, as users within a system or service, via email or other addresses, etc.

Various blocks and operations of methods 400 and 500 can be performed in a different order than shown and/or at least partially simultaneously, where appropriate. For example, some implementations can perform blocks of the methods at various times and/or based on events not related to those described. In some implementations, blocks or operations of methods 400 and 500 can occur multiple times, in a different order, and/or at different times in the methods. In some implementations, the methods 400 and/or 500 can be implemented, for example, on a server system 102 as shown in FIG. 1. In some implementations, one or more client devices can perform one or more blocks of these methods instead of or in addition to a server system performing one or more blocks.

FIGS. 6-11 are diagrammatic illustrations of examples of display screen interfaces displayable on devices used by a user, and which can be used to implement one or more features for using supervised contact lists as described herein. In these examples, a controlling user can set up a supervisory account structure as described above using a client device displaying interfaces which are provided by a server system that implements the account structure. In these examples, client devices are used by users of user accounts in the structure which can display user interfaces to one or more application programs implemented by the client devices and/or connected server systems, where the programs utilize features of supervised contact lists and a supervisory account structure. In these examples, the supervisory account structure is a family account structure in which the users are family members of a single family, supervisor accounts are parent accounts, and supervised accounts are child accounts.

Figure 6:
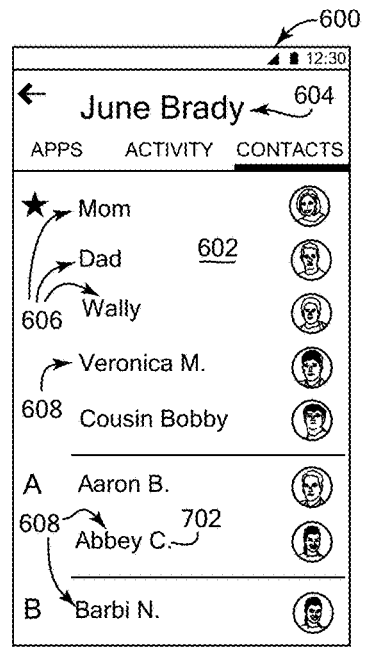
FIGS. 6-11 are diagrammatic illustrations of examples of display screen interfaces which can be used with supervised contact list features described herein.

FIG. 6 shows a user interface 600 displayed on a display screen of a device, where the device is used by a user of a supervisor account in a supervisory account structure, e.g., a parent user of a family account structure. The interface 600 displays a personal contact list 602 associated with a supervised user 604 of the account structure, who in this example is a child user under a predetermined age and who is associated with a child account of the family account structure. In this example, since the child user is under the predetermined age, the child account is more supervised than other child or user accounts in the family account structure. The additional supervision in this example includes the ability of a parent user to view the personal contact list 602 of the child user on a device of the parent user as shown in FIG. 6, e.g., by receiving the personal contact list data from a server system or from a device used by the child user 604 with the child account. Features described for parent and child users can be provided for other types of supervisor users and supervised users in other implementations.

Personal contact list 602 includes (e.g., by default) user identifiers 606 of the family member users of the family account structure. In this example, list 602 also includes identifiers 608 of other users who are not associated with accounts in the family account structure. For example, the child user of this child account may have added the other users to the personal contact list as in the method 500 described above, e.g., with prior parental approval or not, in various cases. In some implementations, a parent user can review the personal contact list and edit the list as desired. For example, a user may have been added to the personal contact list 602 by the supervised user under conditions in which parent user approval was not needed, where the parent user could review the personal contact list 602 at a later time to make sure he or she approves of the added users.

In some implementations, the personal contact list 602 of the child user can be an identical list to the supervised contact list of approved users (shown in FIG. 8) for that child user. In other cases or implementations, the personal contact list 602 may differ. For example, the personal contact list 602 may have less users listed than the supervised contact list, where the supervised user 604 is able to add additional users onto the personal list 602 that are listed in the supervised contact list but has not yet done so.

In some implementations, the child user is able to select any of the user identifiers listed in the personal contact list 602 when the list is displayed on a device used by the supervised user. This selection causes a call or other communication to be initiated to the selected user. In some implementations, this call functionality is not available to the parent user in interface 600, since the parent user is reviewing and editing the child user's contact list and not using it as an application to initiate communications. In other implementations, the parent user is able to select a listed user to initiate a communication to that user from the parent's device.

Figure 7:
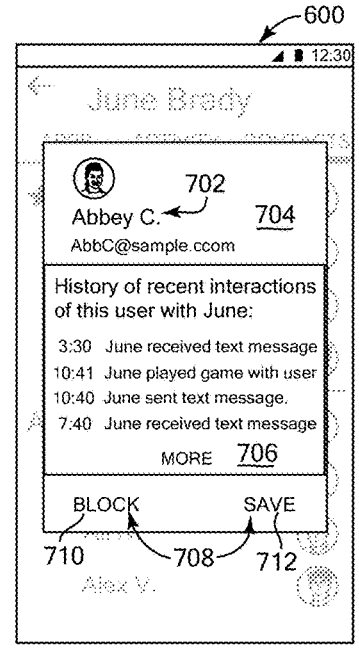

FIG. 7 shows user interface 600 after the parent user has selected one of the user identifiers 608 listed in the personal contact list 602 shown in FIG. 6. In response to the selection of a user 702 in list 602, an information panel 704 can be displayed in the interface 600, e.g., over the list 602, in a different window, etc. Information panel 704 can display a variety of information about the selected user 702. In this example, panel 704 lists the name, network address (e.g., email address), and/or other identifiers of the selected user 702. Additional addresses can also be displayed, e.g., phone numbers, physical addresses, etc. For example, the selected user 702 (and/or a supervisor user for the user account of the selected user 702) has consented to have particular user data for user 702 available to one or more other user accounts, allowing the display of some information in panel 704 in some cases. Public data about user 702 can also be displayed in panel 704, e.g., a user name visible to other users.

Some implementations can display a history 706 of interactions between the child user 604 whose personal contact list is being viewed, and the selected user 702 who is in the personal contact list. The history 706 can include any of a variety of interactions, the types of which can be designated by the parent user in preferences or settings, in some implementations. For example, such interactions may provide the parent user more information as to how the child user has interacted with the selected user, and assist the parent user in deciding whether to leave this user on the approved contact list or to block or remove the user. In this example, history 706 includes descriptions of particular device activities involving the child user and the selected user and the times that those activities occurred, e.g., text messages received or sent by the child user (including pictures, audio, or other types of content sent), video calls and voice calls made between the child user and the selected user, games played together, and/or other activities including user-related activities described above with reference to FIG. 5.

Panel 704 can also display commands or options 708 including an option 710 to block the selected user 702, and an option 712 to save the selected user 702. The block option 710 allows the parent user to block future involvement of the selected user in user-related activities of the child user 604. In some implementations or cases, the block option 710 also removes or deletes the selected user 702 from the approved list of the supervised contact list of the child user (shown in FIG. 8), if the selected user 702 has been stored on that list. In other cases, the selected user 702 was not stored on the approved contact list and the block option 710 can prevent the selected user 702 from being stored on that list (e.g., unless overridden by a parent user or other supervisor user). The save option 712 allows the parent user to store the user identifier(s) for the selected user 702 on the approved list of the supervised contact list, if the selected user is not already stored there. For example, the selected user 702 may have interacted with the child user 604 previously but the parent user delayed approving and adding the selected user to the approved list. In another example, the parent user may have sent a temporary approval to activities of the child user related to the selected user, so that the parent user could later review the selected user 702 in interface 600 and approve or disapprove of the selected user at that time. In another example, the parent user may not have selected to perform one or more approvals at the time of the activities so that the selected user 702 has not yet been added to the approved list, e.g., in a scenario where the parent user makes one or more additions of users to the supervised contact list at later times (after the user-related activity) using interface 600.

Figure 8:
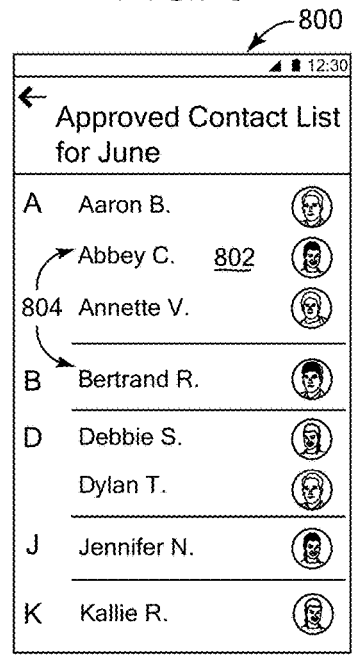

FIG. 8 shows an example interface 800 displaying an approved contact list 802 of the supervised contact list for the child account of child user 604. Interface 800 can be displayed on a device, e.g., a device used by a parent user or other supervisor user. Approved contact list 802 includes identifiers 804 of users who have been approved for involvement with the associated child user 604 in user-related activities as described above. As described above, the approved contact list 802 may list the same users as a child user's personal contact list 602, or may list a different set of users. For example, the personal contact list 602 may list one or more users that have not yet been approved by the parent user and so are not yet listed on the approved contact list 802, or the approved contact list 802 may list one or more users not yet included in the personal contact list 602.

A parent user (or other supervisor user) can select any of the user identifiers on list 802 to obtain information about the selected user, e.g., displayed in an information panel providing types of information similar to the panel 704 of FIG. 7. User data for a user can be available for display if consent to provide that user data has been obtained from the associated user. A parent user can delete (e.g., block) any of the users in the list 802 by deleting user identifier(s) in the list associated with a particular user. For example, some implementations can provide a block or delete option similarly as described above for information panel 704 of FIG. 7. In some implementations, a parent user can define particular conditions or attributes for particular users listed in approved contact list 802. For example, the parent user can select a user and indicate that the user only has approved status for a predetermined period of time, e.g., a specified number of days, weeks, months, etc., or the length of a school year for the associated child user 604. After the predetermined period of time has expired, the system automatically removes the selected user from the approved contact list 802. If the child user later attempts to involve such a removed user in a user-related activity on the device, the parent user can be required to approve that user in order for the user to be reinstated on the approved contact list 802. Any previous listings (and removals) of users on the list 802 can be indicated to the parent user in interface 800 to inform his or her approval decision.

Figure 9:
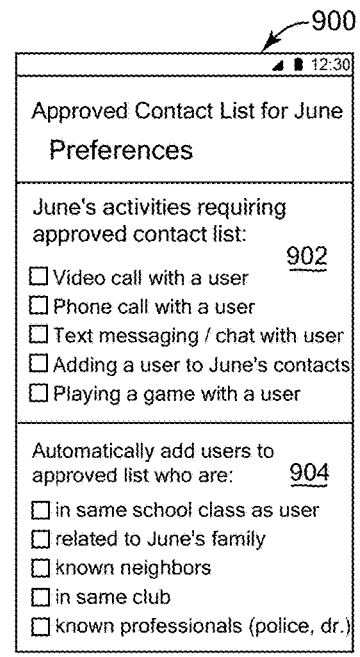

FIG. 9 shows an example interface 900 displaying some preferences which can be made available to the parent user (or other supervisor user) relating to features involving the supervised contact list as described herein, according to some implementations. For example, interface 900 can be displayed in response to selecting an option in interface 800 or 600 (not shown). In some implementations, preferences affecting a supervised contact list can be stored in association with the affected supervised contact list.

In this example, the displayed preferences include preferences 902 that define which user-related device activities of the associated child user require a particular user involved in the activity to be present on the approved contact list (or otherwise previously approved by the parent user). For example, the parent can be allowed to designate whether one or more types of activities qualify for this requirement, e.g., types of activities including video calls, voice calls, text messaging and text chat, adding a user to a personal contact list, and playing a game. Other types of activities can also be listed. If a particular type of activity is not designated to require the approved contact list, then an activity of that type can be performed via the child account and continued regardless of whether the other particular user is present on the approved contact list.

In this example, interface 900 also displays preferences 904 for defining particular types of users that qualify to be automatically added to the approved contact list without specific approval from the parent user, e.g., if the child user performs an activity related to (e.g., involving) those types of users. Such users can, of course, be reviewed later by the parent user to determine if they should remain on the approved contact list, e.g., using interface 600 or 800 as described above. For example, the parent is allowed to designate a variety of types of users that can be automatically added to the approved contact list, including users in the same school class as the associated child user, users who are related to the child user's family, neighbors that are known to the parent user (e.g., other users can be judged by the system to be "known" by the parent user based on the system examining communications of the parent user (with parent user consent) involved with the other users via one or more devices, e.g., emails, text messages, social networking messages, calls, etc.), users who are in the same club or organization as the child user, known professionals including doctors, police, etc. (can be similarly judged to be known via previous communications of the parent user and these users via the parent's device(s)). Additional types of users can also be displayed, and/or new, custom types of users defined by any parent user of the supervisory account structure. In some implementations, the interface 900 can also display options as to whether the automatically added user is permanently added to the approved contact list and so requires no later parent user review and approval. Or the option can designate temporary addition to the approved contact list (or other temporary approved status), e.g., such that a notification is sent to the parent user to suggest reviewing this user as to whether the user should be permanently added to the approved contact list or not, or the user is automatically removed from the approved contact list after a predefined time period expires and/or other predefined conditions occur.

Figure 10:
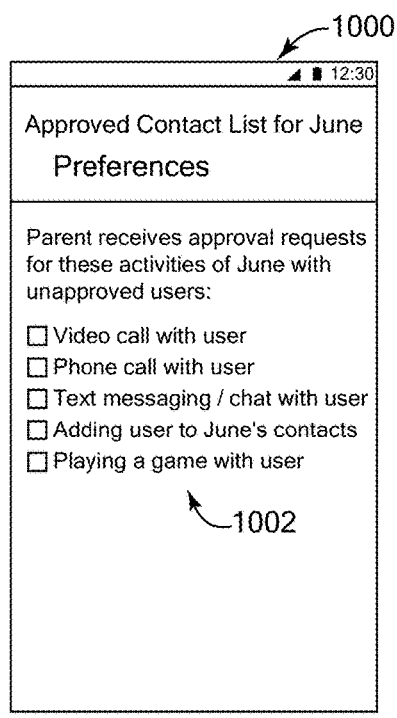

FIG. 10 shows an example interface 1000 displaying additional example preferences which can be made available to the parent user (or other supervisor user) relating to features involving the supervised contact list as described herein, similar to interface 900 of FIG. 9. In this example, interface 1000 displays preferences 1002 for defining which user-related device activities of the associated child user require that a request for approval be sent to the parent user in the event that the involved other user is not listed on the approved contact list (e.g., the other user has not yet been evaluated for approval by a parent user). Such preferences allow the parent user to define which activities for which he or she will be immediately notified and requested for approval of the activity, and which activities will be allowed to take place for the child user without approval, e.g., with the parent user notified of the activity in some implementations. For example, the activities displayed for selection can be similar to the activities 902 provided in interface 900, or can be a different set of activities. Some examples of activities with unapproved users shown in FIG. 10 include a video call with a user, a phone call with a user, text messaging or chat with a user, adding a user to the child user's contacts, and playing a game with a user. Other activities can also be indicated in similar preferences.

Figure 11:
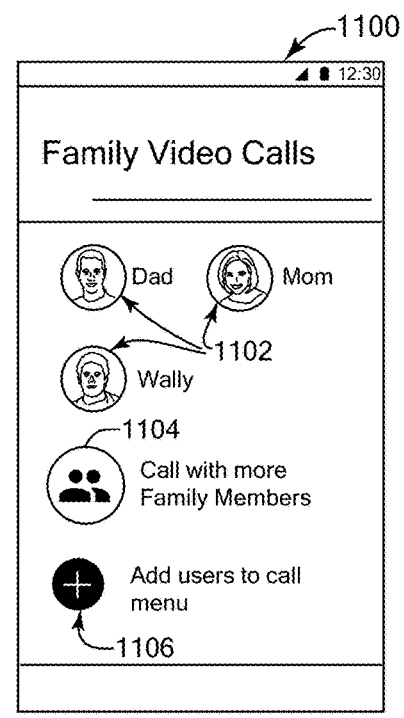

FIG. 11 shows an example call interface 1100 which can be used with features of an approved contact list described herein, according to some implementations. Interface 1100 can be displayed by a device similarly as the other example interfaces of FIGS. 6-10. In this example, the supervised user (e.g., child user) has selected to display call interface 1100 to have options in making a call or other communication with one or more other users using a device via a supervised account, e.g., a child account for a child user under a predetermined age and thus having high supervision. For example, in some implementations the interface 1100 can be displayed by an application program running on a device used by the child user and on which the child user has logged into his or her child account.

Interface 1100 can display a menu of user icons 1102 associated with the other users of the supervisory account structure, which is a family account structure in this example. The user can select any of the icons 1102 to cause the device to automatically initiate a call with the selected family member user. The required call information of the selected user, e.g., phone number or network address, can be stored and associated with each appropriate icon 1102. In some implementations, the call can be a video call, providing both captured audio data and video data to both participants of the call, or can be a voice call providing only audio data in one or both directions of transmission. Some implementations can provide a conference call control 1104 which allows the user to select two or more recipients for the call in the initiation of the call. In other implementations or cases, the user can add one or more other family member users to a call that is already in process with another user (or can add non-family members to the call in some implementations).

In some implementations, not just the family members (or other members of the associated supervisory account structure) have icons displayed in the call menu, but all users (or a user-designated subset of users) who are listed in the approved list of the supervised contact list can be displayed in the call menu, e.g., alphabetically as in the example of FIG. 6, or according to some other displayed format.

A control 1106 can be provided in some implementations to allow the user to select new users to add to the call menu of user icons 1102. For example, such new users can be users that are not members of the family account structure of the device user. In some examples, the device user can input a desired network address of the user to be added (e.g., user name on a user account, email address, etc.), or the device can present a list of suggested users from which to select, e.g., based on the users that the device user has communicated with in the past. In some implementations, if the device user is a child user of a child account and is allowed only limited activities, then the device can first determine whether a new user desired to be added to the call menu is present on the approved contact list associated with the device user. If the new user is present on the list, the new user can be added to the call menu as an icon similar to icons 1102. If the new user is not present on the list, then the device can prohibit the addition of the new user to the call menu. In some implementations, if the new user is not present on the approved contact list, the device can request permission or approval from a parent user of the family (or other supervisory user of the supervisory account structure) to be able to add the user to the call menu, similarly as described above. In some implementations, a disapproved contact list associated with the device user can be consulted to determine if the new user is present on that list, and if so, the attempted addition of the new user to the call menu can be blocked.

Several features described herein are related to using an account structure with a supervised contact list to allow enhanced supervision and control by supervisor users of device activities provided on supervised user devices. In some examples using a family account structure, a supervised contact list includes an approved contact list of users who have been approved or authorized by a parent user in the family account structure to be able to communicate with a particular associated child account in that family account structure. The supervised contact list can be stored in association with the child account. The parent user can add any user, approved by the parent, to the list at any time. Communication applications, game applications, shared activity applications, and other applications on a child's device can consult the supervised contact list if relevant child device activities are detected that involve other users. For example, each time a child user wishes to communicate with a user, the child's device receives a communication from a user, and/or the child user adds a new user contact to the child device, the system can consult the supervised contact list to determine whether the user is parent-approved (or disapproved, in some implementations). For example, if a child wishes to invite five friends to his or her group within a game on the child's device, the game application can consult the list to see if the five friends are approved. In some cases, the application may only allow approved users to be invited to the game. Some implementations can provide a supervised contact list that additionally or alternatively includes a disapproved contact list of users as described herein.

In some implementations, if the child is to communicate with a user who is not on the list (and, in some implementations, who was not previously disapproved), the child device can send a request or notification to the parent account via the family account structure. The parent user can receive the request and either approve or reject the user. The parent user can also be sent a context of the request or notification, e.g., what activity the child is doing, screen capture of the child's device, etc. If the parent user approves, the child user's device allows the communication and the user is added to the supervised contact list. If the parent rejects the user or communication (or other activity), the activity involving child user and other user is not allowed by the child's device. Thus child user activities using a device are safe and vetted by the parent user.

Figure 12:
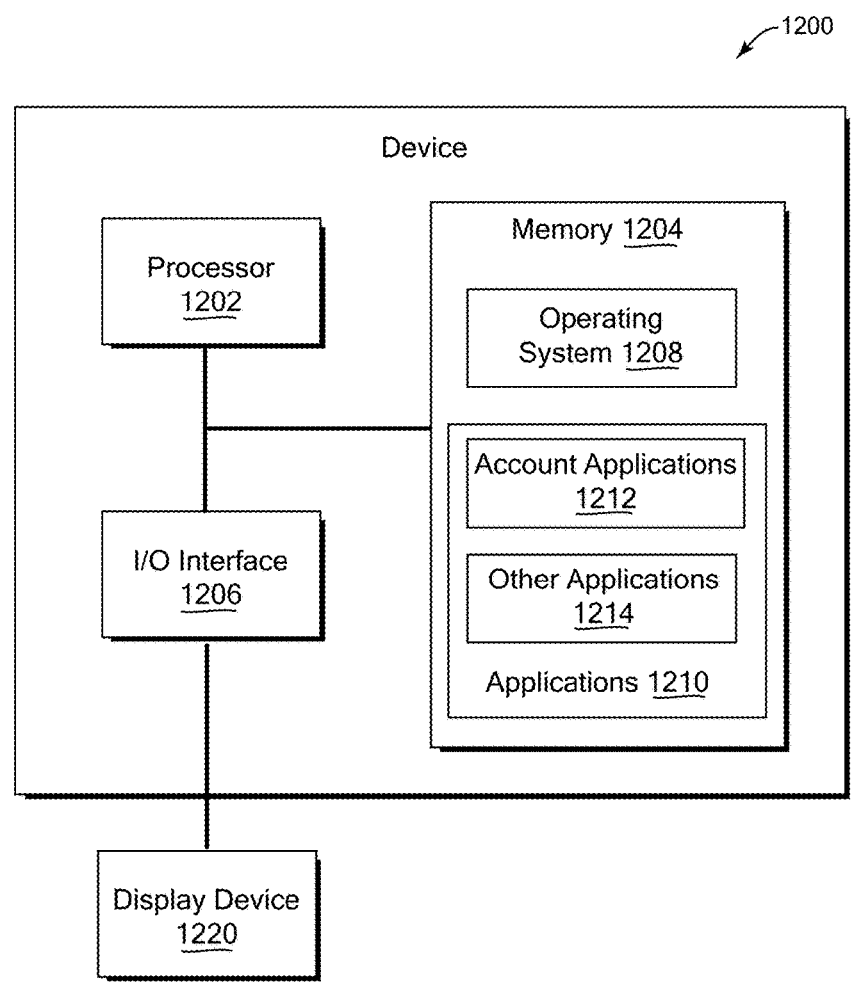
FIG. 12 is a block diagram of an example device which may be used for one or more implementations described herein.

FIG. 12 is a block diagram of an example device 1200 which may be used to implement one or more features described herein. In one example, device 1200 may be used to implement server device 104 of FIG. 1, and perform appropriate method implementations described herein. Device 1200 can be any suitable computer system, server, or other electronic or hardware device. For example, the device 1200 can be a mainframe computer, desktop computer, workstation, portable computer, or electronic device (portable device, cell phone, smart phone, tablet computer, television, TV set top box, personal digital assistant (PDA), media player, game device, wearable device, etc.). In some implementations, device 1200 includes a processor 1202, a memory 1204, and input/output (I/O) interface 1206.

Processor 1202 can be one or more processors or processing circuits to execute program code and control basic operations of the device 1200. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1204 is typically provided in device 1200 for access by the processor 1202, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1202 and/or integrated therewith. Memory 1204 can store software operating on the device 1200 by the processor 1202, including an operating system 1208 and one or more applications or engines 1210, e.g., a communications application, web hosting engine, social networking engine, media content server engine, etc. In some implementations, the applications 1210 can include instructions that enable processor 1202 to perform the functions described herein, e.g., some or all of the methods of FIGS. 4-5 and interfaces of FIGS. 6-11.

For example, applications 1210 can include one or more account applications 1212. Account applications 1212 can include application programs enabling one or more features described herein. For example, account applications running on a server device can enable the creation, modification of account structures and user accounts within the account structures based on input from a supervisor account. Some account applications 1212 can, for example, provide monitoring and control functionality based on supervisor user input, and can provide checks, options and processing related to a supervised contact list, e.g., determine if activities of supervised accounts meet supervised contact list requirements, process and/or transmit data and requests to supervisor devices connected to a server device, etc. In some implementations, the account application(s) can provide various user interfaces, some examples of which are described herein. Other applications or engines 1214 can also or alternatively be included in applications 1210, e.g., media display applications, web hosting engine or application, social networking engine or application, etc.

Any of software in memory 1204 can alternatively be stored on any other suitable storage location or non-transitory computer-readable medium. In addition, memory 1204 (and/or other connected storage device(s)) can buffer and/or store account data, supervised contact lists, preferences, attributes, settings, lists and histories of activities and applications, conditions, instructions and/or other data used in the features described herein. Memory 1204 and any other type of storage (magnetic disk, optical disk, magnetic tape, or other tangible media) can be considered "storage devices."

I/O interface 1206 can provide functions to enable interfacing the device 1200 with other systems and devices. For example, network communication devices, storage devices (e.g., memory and/or database 106), and input/output devices can communicate via interface 1206. In some implementations, the I/O interface can connect to interface devices including input devices (buttons, keyboard, pointing device, touchscreen, microphone, camera, scanner, etc.) and output devices (display screen or other display device, speaker devices, printer, motor, etc.). Display device 2220 is one example of an output device that can be used to display graphical interfaces, data, etc. Display device 2220 can be connected to device 2200 via local connections (e.g., display bus) and/or via networked connections and can be any suitable display device. For example, a display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

For ease of illustration, FIG. 12 shows one block for each of processor 1202, memory 1204, I/O interface 1206, and software blocks 1208 and 1210. These blocks may represent one or more processors or processing circuitries, operating systems, memories, I/O interfaces, applications, and/or software modules. In other implementations, device 1200 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

As a client device, device 1200 can also implement and/or be used with features described herein, e.g., as any of client devices 120-126 shown in FIG. 1. Example client devices can include some similar components as the device 1200, e.g., processor(s) 1202, memory 1204, and I/O interface 1206. An operating system, software and applications suitable for the client device can be provided in memory and used by the processor. For example, network communication drivers and/or application software, sensor system software, etc. can be used. In some examples, account applications running on a supervisor (e.g., parent) client device can enable the creation and modification of account structures and user accounts within the account structures. A supervisor (e.g., parent) device can run account application(s) providing the ability and options to monitor and/or control devices used via supervised user accounts and/or supervised contact lists. A supervised (e.g., child) device can run one or more applications that include functionality providing monitoring of activities and applications performed on the supervised device, examining supervised contact lists, and/or input of requests for permission. Supervised device applications can send activity data and requests for permission to supervisor accounts. In some implementations, account application(s) can provide various user interfaces, some examples of which are described herein.

The I/O interface for a client device can be connected to network communication devices, as well as to input and output devices, e.g., a microphone for capturing sound, a camera for capturing images or video, audio speaker devices and sound emitters for outputting sound, a display device for outputting images or video, a touchscreen for capturing touch input on a display screen, actuators for providing haptic output, or other output devices. A display device, for example, can be used to display the images and other data as described herein, where such device can include any suitable display device, e.g., an LCD, LED, or plasma display screen, CRT, television, monitor, touchscreen, 3-D display screen, or other visual display device. Some implementations can provide an audio output device, for media content output and other output, e.g., voice output or synthesis that speaks text and/or describes settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users are provided with an opportunity to control whether programs or features collect user information (e.g., images depicting the user, information about a user's social network, user characteristics (age, gender, profession, etc.), social actions or activities, a user's preferences, or a user's current location), if appropriate as noted above. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user has control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
   obtaining, at a supervised device, a plurality of user identifiers over a network from a device that implements a supervised account, wherein the plurality of user identifiers are provided in a supervised contact list associated with the supervised account;
   detecting, at least partially by the supervised device operated by a supervised user associated with the supervised account, that an activity using the supervised device is pending on the supervised device, wherein the activity includes communication between the supervised device and a device of a particular user, wherein the activity is detected based on input received by the supervised device from at least one of: the supervised user, or the device of the particular user;
   associating the particular user with a particular user identifier;
   determining whether the particular user identifier is absent from the supervised contact list;
   determining whether the particular user corresponds to one or more indicated users that are indicated by the supervised device to have previously communicated with a supervisor device associated with a supervisor user;
   in response to determining that the particular user is absent from the supervised contact list and in response to determining that the particular user does not correspond to the one or more indicated users, automatically disallowing, by the supervised device, the activity using the supervised device by disconnecting the communication between the supervised device and the device of the particular user; and
   in response to determining that the particular user is absent from the supervised contact list and in response to determining that the particular user corresponds to at least one of the one or more indicated users, causing the particular user identifier to be automatically added to the supervised contact list without providing a request for approval of the activity from the supervisor user and without prior receipt of approval of the activity from the supervisor user.

2. The method of claim 1 wherein the supervised account is included in a stored supervisory account structure comprising a plurality of user accounts that provide access to a server system by associated users, wherein a supervisor user is associated with a supervisor account included in the supervisory account structure, wherein the supervisory account structure includes a plurality of supervised accounts, and wherein the particular user is an external user that is associated with a user account external to the supervisory account structure, and further comprising:
in response to automatically disallowing the activity using the supervised device, causing the supervised device to display, on a display device, a status message that indicates that the activity has been disallowed.

3. The method of claim 1 wherein causing the particular user identifier to be added to the supervised contact list includes causing the particular user identifier to be temporarily added to the supervised contact list for a particular period of time, such that the particular user identifier is removed from the supervised contact list after the particular period of time has expired.

4. The method of claim 1 wherein the activity using the supervised device includes at least one of:
communication between the supervised device and the device of the particular user in one of a voice call, a video call, and a text chat; or
communication between the supervised device and the device of the particular user in a game initiated by the supervised device.

5. The method of claim 1 further comprising:
obtaining a current geographical location of the particular user;
determining whether the current geographical location of the particular user corresponds to one or more predetermined geographic locations that have been associated with the supervised contact list; and
wherein the automatically disallowing is further in response to a first result of a comparison of the current geographical location of the particular user to the one or more predetermined geographical locations.

6. The method of claim 1 wherein causing the particular user identifier to be automatically added to the supervised contact list is performed such that the particular user identifier is present on the supervised contact list only for a predetermined number of activities on the supervised device, wherein each of the predetermined number of activities is a same type of activity as the activity using the supervised device.

7. The method of claim 2 wherein the supervised contact list is stored on a server device in association with the supervised account, and wherein an associated supervised contact list is stored in association with each supervised account of the supervisory account structure having one or more predefined attributes, wherein the supervised contact list is associated with the plurality of supervised accounts.

8. The method of claim 1 wherein the supervised contact list is stored on a server device in association with the supervised account, wherein the supervised account is included in an account structure that is a family account structure including one or more supervisor accounts that are parent accounts associated with one or more parent users and a plurality of supervised accounts that are child accounts associated with a plurality of child users under a predetermined age and are each associated with a stored attribute in the family account structure that indicates the child users are under the predetermined age, and wherein the supervised contact list is stored in association with the plurality of child accounts, and
wherein determining whether the particular user identifier is absent from the supervised contact list is performed in response to determining that the supervised account is associated with the stored attribute.

9. The method of claim 1 further comprising, in response to determining that the particular user identifier is absent from the supervised contact list and that the particular user does not correspond to the one or more indicated users:
sending a request over the network to the supervisor device for approval of the particular user, and wherein the disallowing the activity using the supervised device is also based on a failure within a predetermined period of time to receive a response approval over the network originating from the supervisor device of the supervisor user.

10. The method of claim 1 further comprising, in response to determining that the particular user identifier is absent from the supervised contact list and determining that the particular user does not correspond to the one or more indicated users:
sending a request over the network to the supervisor device for approval of the particular user;
in response to receiving, over the network, a temporary approval originating from the supervisor device in response to the request, causing the automatic disallowing to be delayed until a disapproval originating from the supervisor device is received by the supervised device over the network; and
in response to receiving, over the network, a particular approval originating from the supervisor device in response to the request, causing the particular user identifier to be added to the supervised contact list.

11. The method of claim 1 wherein the supervised account is associated with one or more stored designations of one or more types of device activities for the supervised account that require examining the supervised contact list, wherein the one or more types of device activities are selected from a set of activities including communication of the supervised device with a user device over the network, addition of an identification of the particular user or a user account of the particular user to a personal contact list, and participating in a game by the supervised device over the network, and further comprising:
checking a stored permissions framework as to whether the activity is included in the one or more types of device activities,
wherein determining whether the particular user identifier is absent from the supervised contact list is performed in response to the activity being included in the one or more types of device activities.

12. The method of claim 1 wherein the supervised account is associated with one or more designations of one or more types of activities, wherein the one or more types of activities are selected from a set of activities including communication of the supervised device with a user device over the network and addition of an identification of the particular user to a personal contact list of the supervised user, and further comprising:
checking whether the activity using the supervised device is included in the one or more types of activities; and
causing a request for permission to be sent over the network to the supervisor device in response to determining that the activity is included in the one or more types of activities and in response to determining that the particular user identifier is absent from the supervised contact list, wherein disallowing the activity is performed in response to receiving a denial over the network from the supervisor device in response to the request for permission.

13. A system comprising:

a storage device; and at least one processor accessing the storage device and configured to perform operations comprising:

obtaining, at a supervised device, a plurality of user identifiers and approval attributes for the plurality of user identifiers over a network from a device that implements a supervised account, wherein the plurality of user identifiers are provided in a supervised contact list;

detecting, at least partially by the supervised device operated by a supervised user associated with the supervised account, that an activity using the supervised device is related to a particular user and is pending on the supervised device, wherein the activity is detected based on input received by the supervised device from at least one of: the supervised user, or a device of the particular user;

determining that the activity is of a type that requires examining the supervised contact list;

associating the particular user with a particular user identifier of the plurality of user identifiers;

determining whether the particular user identifier is present on the supervised contact list;

determining whether the particular user corresponds to one or more indicated users that are indicated by the supervised device to have previously communicated with a supervisor device associated with a supervisor user;

in response to determining that the particular user identifier is present on the supervised contact list and in response to determining that the particular user does not correspond to the one or more indicated users, automatically disallowing, by the supervised device, the activity using the supervised device; and in response to determining that the particular user is present on the supervised contact list and in response to determining that the particular user corresponds to at least one of the one or more indicated users, causing the particular user identifier to be automatically added to the supervised contact list without providing a request for approval of the activity from the supervisor user and without prior receipt of approval of the activity from the supervisor user.

14. The system of claim 13 wherein the activity includes communication between the supervised device and a device of a particular user over the network, and wherein automatically disallowing the activity includes disconnecting the communication between the supervised device and the device of the particular user.

15. The system of claim 13 further comprising, in response to determining that the particular user identifier is present on the supervised contact list:

sending a request over the network to a supervisor device for approval of the particular user;

in response to receiving, over the network, a temporary approval originating from the supervisor device in response to the request, causing the automatic terminating to be delayed until a disapproval originating from the supervisor device is received by the supervised device over the network; and in response to receiving, over the network, a particular approval originating from the supervisor device in response to the request, causing the particular user identifier to be added to the supervised contact list.

16. A non-transitory computer readable medium having stored thereon program instructions that, when executed by a processor, cause the processor to perform operations including:

obtaining, at a supervised device, a plurality of user identifiers over a network from a storage device that implements a supervised account, wherein the plurality of user identifiers are provided in a supervised contact list associated with the supervised account;

detecting, by a supervised device operated by a supervised user associated with the supervised account, that an activity using the supervised device is related to a particular user is pending on the supervised device, wherein the activity is detected based on input received by the supervised device from at least one of: the supervised user, or a device of the particular user;

associating the particular user with a particular user identifier;

determining whether the particular user identifier is absent from the supervised contact list associated with the supervised account;

in response to determining that the particular user is absent from the supervised contact list and in response to determining that the particular user does not correspond to the one or more indicated users, automatically disallowing, by the supervised device, the activity using the supervised device; and in response to determining that the particular user is absent from the supervised contact list and in response to determining that the particular user corresponds to at least one of the one or more indicated users, causing the particular user identifier to be automatically added to the supervised contact list without providing a request for approval of the activity from a supervisor user and without prior receipt of approval of the activity from the supervisor user.

17. The computer readable medium of claim 16 further comprising, in response to determining that the particular user identifier is absent from the supervised contact list, sending a request for approval of the particular user to a supervisor device over the network, sending the request for approval to the supervisor device, including sending screen capture data to the supervisor device that includes data displayed on a display screen of the supervised device that indicates the activity using the supervised device.

18. The computer readable medium of claim 16 wherein causing the particular user identifier to be added to the supervised contact list includes causing the particular user identifier to be temporarily added to the supervised contact list for a particular period of time, such that the particular user identifier is removed from the supervised contact list after the particular period of time has expired.

* * * * *